US010298331B2

(12) United States Patent
Koiwai

(10) Patent No.: US 10,298,331 B2
(45) Date of Patent: May 21, 2019

(54) OPTICAL TRANSMISSION SYSTEM AND OPTICAL TRANSMITTER

(71) Applicant: Fujitsu Optical Components Limited, Kawasaki-shi, Kanagawa (JP)

(72) Inventor: Yasushi Koiwai, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/649,157

(22) Filed: Jul. 13, 2017

(65) Prior Publication Data
US 2018/0041281 A1 Feb. 8, 2018

(30) Foreign Application Priority Data

Aug. 4, 2016 (JP) ................. 2016-154073

(51) Int. Cl.
*H04B 10/50* (2013.01)
*H04B 10/077* (2013.01)
*H04B 10/548* (2013.01)
*H04B 10/079* (2013.01)
*H04B 10/572* (2013.01)
(Continued)

(52) U.S. Cl.
CPC ......... *H04B 10/50* (2013.01); *H04B 10/0775* (2013.01); *H04B 10/0795* (2013.01); *H04B 10/548* (2013.01)

(58) Field of Classification Search
CPC ............ H04B 10/50; H04B 10/0795
USPC .................. 398/1, 9, 25
See application file for complete search history.

(56) References Cited

U.S. PATENT DOCUMENTS 5,455,704 A * 10/1995 Mizuochi .......... H01S 3/094003
359/341.33
9,853,728 B2 * 12/2017 Nishihara ........ H04B 10/07957
(Continued)

FOREIGN PATENT DOCUMENTS

JP 2005-109743 4/2005
JP 2013-524672 6/2013

OTHER PUBLICATIONS

Toshiki Tanaka et al. "50 Gbps Class Transmission in Single Mode Fiber using Discrete Multi-tone Modulation with 10G Directly Modulated Laser", OFC2012, OSA, Mar. 2012.
(Continued)

*Primary Examiner* — Oommen Jacob
(74) *Attorney, Agent, or Firm* — Staas & Halsey LLP

(57) ABSTRACT

An optical transmission system is configured to optically transmit data from an optical transmitter to an optical receiver using a plurality of subcarriers. The optical transmitter includes a control unit configured to transmit a measurement signal using a subcarrier included in a band used for optical transmission when a signal is communicated to the optical receiver, the control unit being configured to calculate transmission characteristics obtained between the optical transmitter and the optical receiver based on the measurement signal returned from the optical receiver, and the control unit being configured to allocate, based on the transmission characteristics, a communication link to a subcarrier excellent in the transmission characteristics and least affecting transmission capacity. The optical receiver is configured to return the measurement signal received thereby to the optical transmitter.

17 Claims, 21 Drawing Sheets

(51) Int. Cl.
*H04J 14/02* (2006.01)
*H04L 27/26* (2006.01)

(56) References Cited

U.S. PATENT DOCUMENTS

| | | | | |
|---|---|---|---|---|
| 2003/0025957 | A1* | 2/2003 | Jayakumar | H04B 10/00 398/5 |
| 2003/0072062 | A1* | 4/2003 | Pedersen | G02B 6/4428 398/181 |
| 2005/0128993 | A1* | 6/2005 | Yu | H04B 7/061 370/342 |
| 2007/0153928 | A1* | 7/2007 | Liu | H04L 1/1671 375/260 |
| 2010/0075693 | A1* | 3/2010 | Kishigami | H04B 7/0671 455/452.2 |
| 2010/0260277 | A1* | 10/2010 | Onodera | H04L 1/0026 375/260 |
| 2011/0002282 | A1* | 1/2011 | Inoue | H04L 5/0007 370/329 |
| 2011/0176630 | A1* | 7/2011 | Nakayama | H04B 7/0417 375/267 |
| 2011/0243015 | A1 | 10/2011 | Lim et al. | |
| 2011/0274077 | A1* | 11/2011 | Yamada | H04W 72/042 370/329 |
| 2012/0213111 | A1* | 8/2012 | Shimezawa | H04B 7/063 370/252 |
| 2013/0272698 | A1* | 10/2013 | Jin | H04L 27/2628 398/43 |
| 2014/0314415 | A1* | 10/2014 | Vassilieva | H04J 14/0227 398/76 |
| 2014/0369677 | A1* | 12/2014 | Tanaka | H04B 10/50 398/25 |
| 2015/0071233 | A1* | 3/2015 | Wang | H04L 5/0094 370/329 |
| 2015/0372795 | A1* | 12/2015 | Wu | H04L 5/0057 370/329 |
| 2016/0142150 | A1* | 5/2016 | Lyubomirsky | H04J 14/0221 398/182 |
| 2016/0197679 | A1* | 7/2016 | Tanaka | H04B 10/572 398/79 |
| 2017/0070286 | A1* | 3/2017 | Nishihara | H04B 10/07957 |
| 2018/0041281 | A1* | 2/2018 | Koiwai | H04B 10/0795 |

OTHER PUBLICATIONS

Toshiki Tanaka et al. "*Discrete Multi-tone Technology for 100G Ethernet (100GbE)*", IEEE802.3bm 40Gb/s and 100Gb/s Fiber Optic Task Force, IEEE 802.3 Geneva interim Sep. 2012.
Toshiki Tanaka et al. "*400GbE DMT Tolerance to MPI*", IEEE802.3 Ottawa interim meeting, Sep. 2014.
Toshiki Tanaka et al. "*400GbE DMT Tolerance to MPI using DMT Test Chip*", IEEE802.3 Atlanta interim meeting, Jan. 2015.
David Lewis et al. "400GE DMT Multi-Vendor Interoperability Requirements", JDSU, Jan. 2015.
Masato Nishihara et al. "Impact of modulator chirp in 100 Gbps class optical discrete multi-tone transmission system", Photonics West2013, SPIE, Feb. 2013.
Toshiki Tanaka et al. "400GE DMT Multi-Vendor Interoperability Requirements", IEEE802.3bm 40GB/s and 1-GB/s Fiber Optic Task Force, JDSU, Jan. 2015.
Toshiki Tanaka et al. "400GbE DMT Tolerance to MPI Chip", IEEE802.3 Ottawa interim meeting, Sep. 2014.

* cited by examiner

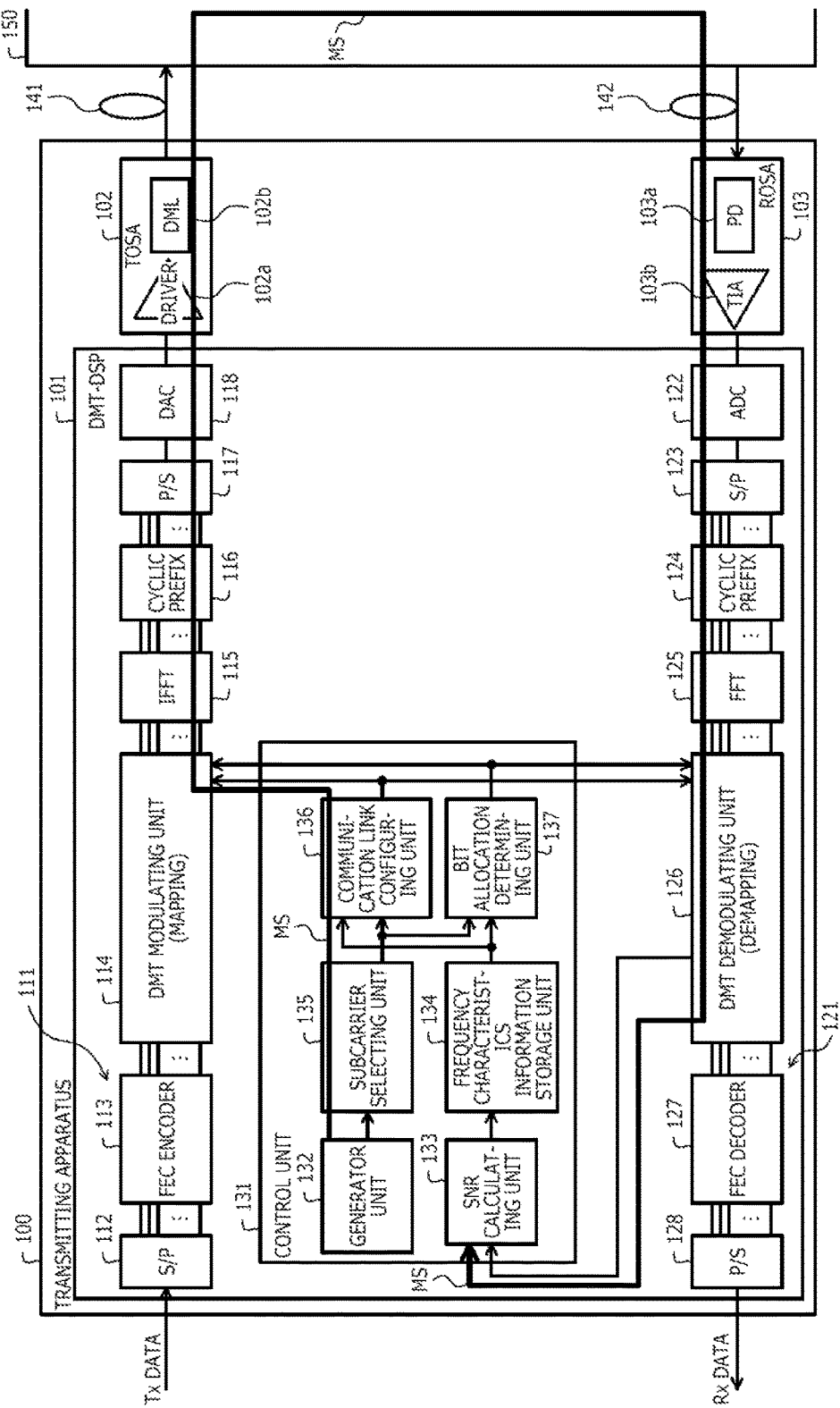

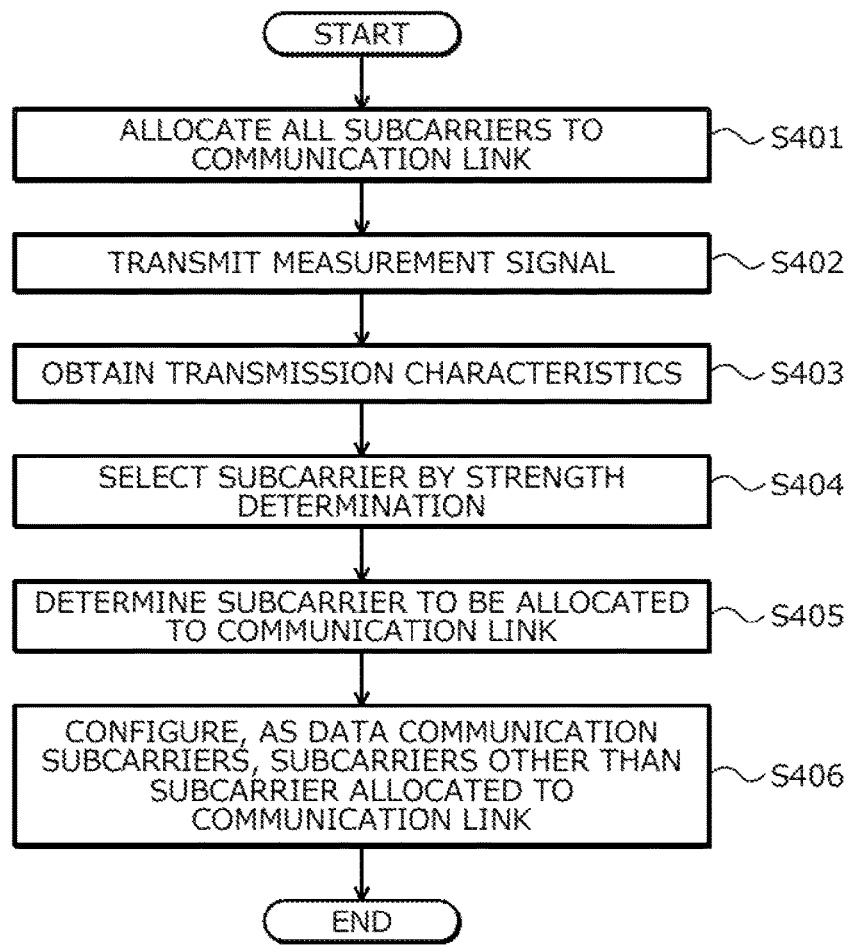

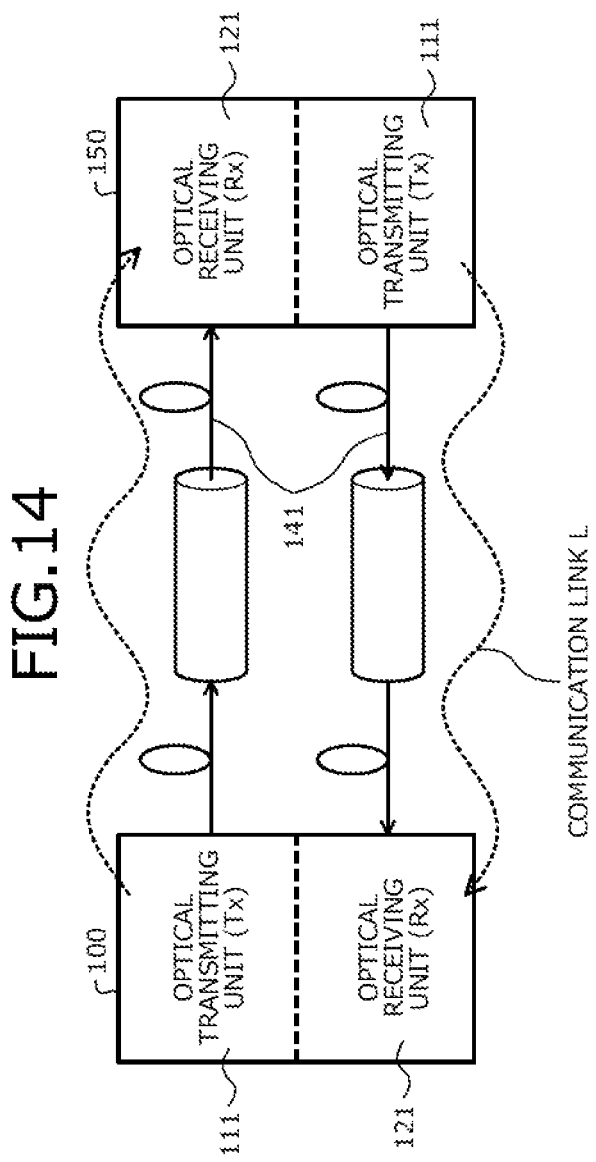

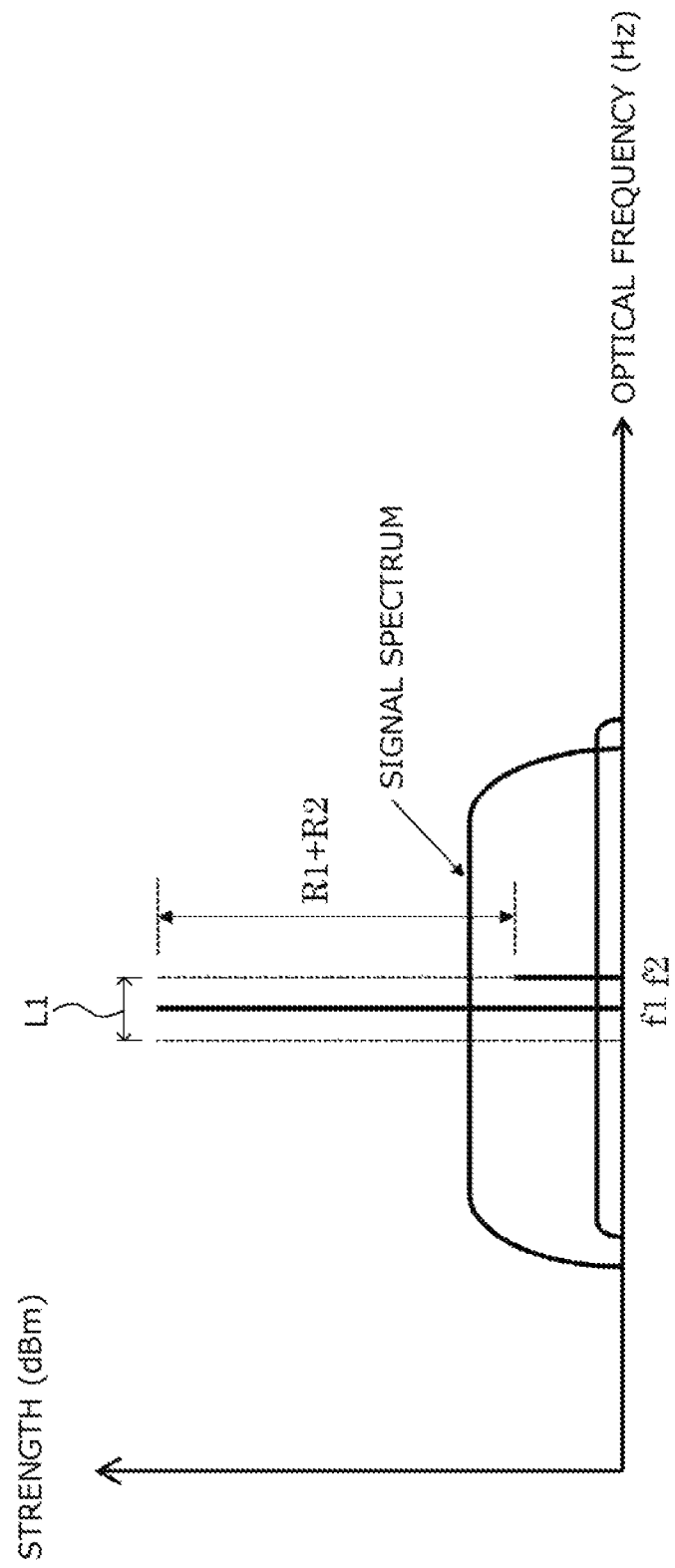

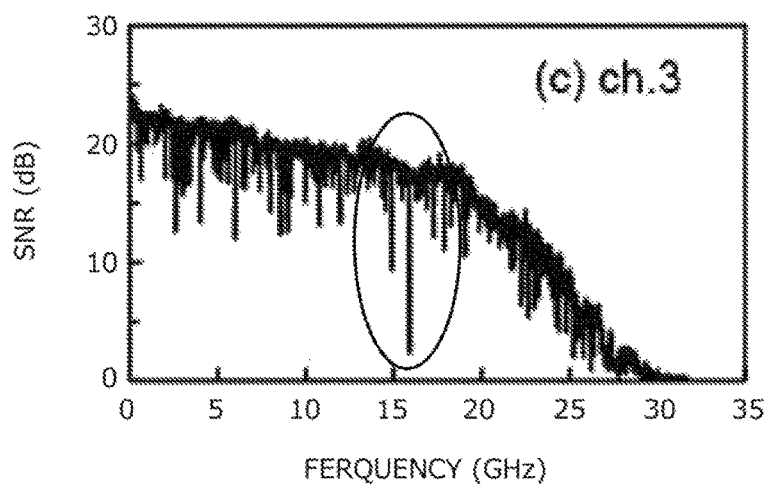

OPTICAL TRANSMISSION SYSTEM AND OPTICAL TRANSMITTER

CROSS REFERENCE TO RELATED APPLICATIONS

This application is based upon and claims the benefit of priority of the prior Japanese Patent Application No. 2016-154073, filed on Aug. 4, 2016, the entire contents of which are incorporated herein by reference.

FIELD

The embodiments discussed herein are related to an optical transmission system and an optical transmitter.

BACKGROUND

In response to a shift to use multiple values for transmission signals, a discrete multi-tone (DMT) scheme has been proposed as a transmission scheme to add a subcarrier modulation signal to a carrier light beam and thereby optically transmit data. Under the DMT scheme, for respective subcarriers whose frequencies are different from each other, negotiation is executed to optimize the transmission capacity according to frequency characteristics including those of the optical transmitter, the optical receiver, and the line path. In this negotiation, for example, bit/power mapping is executed for each of the subcarriers and the degree of multiple values of the modulated signal to be allocated to each of the subcarriers is accordingly varied. According to the DMT scheme, this scheme is thereby applicable also to a low-cost optical device whose band cannot be expanded to a high frequency, and enables an increase of the transmission capacity (for example, refer to Toshiki Tanaka, et al, "50 Gbps Class Transmission in Single Mode Fiber using Discrete Multi-Tone Modulation with 10G Directory Modulated Laser", March 2012, OFC 2012, OSA; and Toshiki Tanaka, et al, "Discrete Multi-Tone Technology for 100G Ethernet (100 GbE)", September 2012, IEEE 802.3 Geneva interim meeting).

A transmitting apparatus based on the DMT scheme has an optical transmitter and an optical receiver that are directly connected to each other (point-to-point connection). The transmitting apparatus allocates a subcarrier that is arbitrarily set from plural subcarriers to a communication link and, after securing the communication link between the transmitter and the receiver, executes the negotiation (for example, refer to David Lewis, et al, "400GE DMT Multi-Vendor Interoperability Requirements", January 2015, JDSU).

A technique has been disclosed to determine a pilot signal and a control channel based on the reception quality of the pilot signal and that of each component carrier in multi-carrier radio communication (for example, refer to Japanese Laid-Open Patent Publication No. 2005-109743 and International Patent Application No. 2013-524672).

SUMMARY

According to an aspect of an embodiment, an optical transmission system is configured to optically transmit data from an optical transmitter to an optical receiver using a plurality of subcarriers. The optical transmitter includes a control unit configured to transmit a measurement signal using a subcarrier included in a band used for optical transmission when a signal is communicated to the optical receiver, the control unit being configured to calculate transmission characteristics obtained between the optical transmitter and the optical receiver based on the measurement signal returned from the optical receiver, and the control unit being configured to allocate, based on the transmission characteristics, a communication link to a subcarrier excellent in the transmission characteristics and least affecting transmission capacity. The optical receiver is configured to return the measurement signal received thereby to the optical transmitter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram of a path for feeding back a measurement signal by the transmitting apparatus according to the first embodiment;

FIG. 4 is a flowchart of a procedure of configuring a subcarrier to be allocated to the communication link, executed by the transmitting apparatus according to the first embodiment;

FIG. 14 is an explanatory diagram of a communication link of a transmitting apparatus based on the DMT scheme;

FIG. 19 is a diagram of an example of interference caused by multiple optical reflections;

FIG. 21 is a graph of an example of frequency characteristics obtained between transmitting apparatuses.

DESCRIPTION OF THE INVENTION

Figure 1:
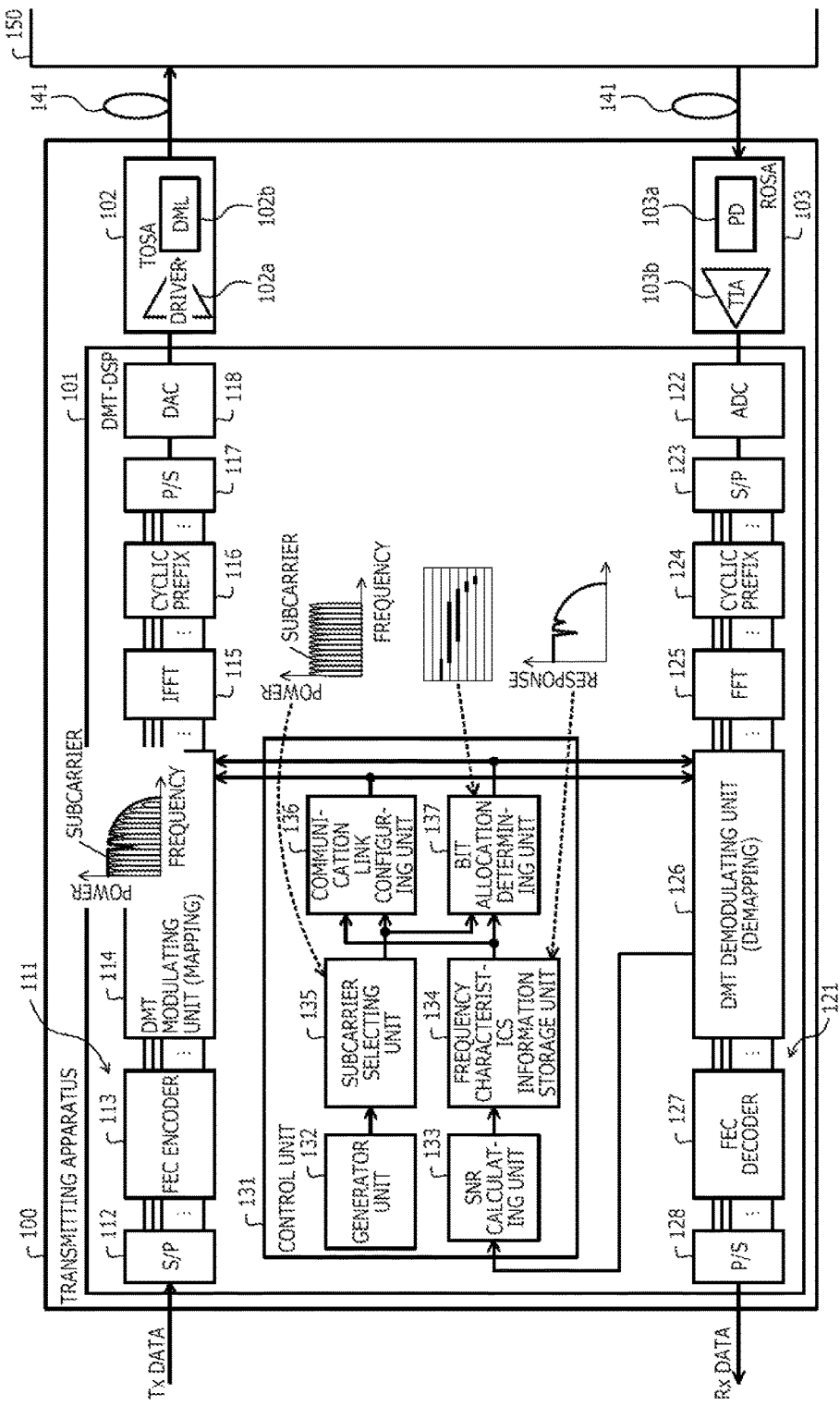
FIG. 1 is a diagram of an example of an internal configuration of a transmitting apparatus used in an optical transmission system according to a first embodiment.

FIG. 1 is a diagram of an example of an internal configuration of a transmitting apparatus used in an optical transmission system according to a first embodiment. The optical transmission system includes a transmitting apparatus 100 and another transmitting apparatus 150 opposite thereto, connected to each other by an optical transmission path 141 such as an optical fiber. The transmitting apparatus 100 and the transmitting apparatus 150 optically transmit data to each other based on the DMT scheme.

The transmitting apparatus 100 includes a DMT-DSP (a transmission and reception processing unit) 101 including a DSP, an optical transmitting unit (TOSA) 102, and an optical receiving unit (ROSA) 103. "TOSA" stands for transmitter optical sub-assembly and "ROSA" stands for receiver optical sub-assembly.

The DMT-DSP 101 includes a transmission-side circuit (optical transmitting unit) 111, a reception-side circuit (optical receiving unit) 121, and a control unit 131 that controls the transmission-side circuit 111 and the reception-side circuit 121.

The transmission-side circuit 111 includes a serial/parallel (S/P) converting unit 112, an FEC encoder 113, a DMT modulating unit 114, an IFFT 115, a cyclic prefix appending unit 116, a parallel/serial (P/S) converting unit 117, and a DAC 118.

The S/P converting unit 112 converts serial data for transmission (Tx DATA) input thereto into parallel data. The FEC encoder 113 encodes the data. The DMT modulating unit 114 allocates the data for transmission to plural subcarriers. The DMT modulating unit 114 executes bit/power mapping for each of the subcarriers and varies the degree of multiple values of the modulated signal (data for transmission) to be allocated to each of the subcarriers (the details of the mapping will be described later).

The IFFT 115 executes inverse fast Fourier Transform (IFFT) with respect to the data for transmission, in sample units of a specific number N. The IFFT 115 regards the N data samples as a subcarrier signal component and executes an IFFT process for the subcarrier component to convert the subcarrier component into a discrete temporal signal.

The cyclic prefix appending unit 116 appends to the data for transmission, a cyclic prefix (a guard interval) that prevents interference between the subcarriers and the like. The P/S converting unit 117 converts parallel data for transmission into serial data. The DAC 118 DA-converts the data for transmission.

An output (the data for transmission) of the DAC 118 is output to the TOSA 102. The TOSA 102 includes a driver 102a and a direct modulation laser diode (DML) 102b. The driver 102a controls the light emission of the DML 102b corresponding to the data for transmission and thereby optically transmits the data for transmission to the opposing other transmitting apparatus 150 through the optical transmission path 141. The opposing other transmitting apparatus 150 may have the same configuration as that of the transmitting apparatus (the transmitting apparatus 100).

Data optically transmitted from the other transmitting apparatus 150 through the optical transmission path 141 is received by the ROSA 103. The ROSA 103 includes a PD 103a and a trans-impedance amplifier (TIA) 103b. The PD 103a converts the optical signal that is optically transmitted and received, into an electrical signal. The TIA 103b amplifies the received data after the conversion thereof into the electrical signal. The received data output from the TIA 103b is input to the reception-side circuit 121 of the DMT-DSP 101 through the DMT demodulating unit 126.

The reception-side circuit 121 has an arrangement configuration inverse to that of the transmission-side circuit 111, and includes an ADC 122, an S/P converting unit 123, a cyclic prefix removing unit 124, an FFT 125, a DMT demodulating unit 126, an FEC decoder 127, and a P/S converting unit 128.

The ADC 122 AD-converts the received data. The S/P converting unit 123 converts the serial data input thereto into parallel data. The cyclic prefix removing unit 124 removes the guard interval (the cyclic prefix) appended to the received data. The FFT 125 executes fast Fourier transform (FFT) for the received data signal.

The DMT demodulating unit 126 demodulates the modulated signal (the received data) allocated to each of the subcarriers, by executing de-mapping. The FEC decoder 127 decodes the encoded data. The P/S converting unit 128 converts the parallel received data into serial data and outputs the serial data as the received data (Rx DATA).

The control unit 131 includes a generator unit 132, an SNR calculating unit 133, a frequency characteristics information storage unit 134, a subcarrier selecting unit 135, a communication link configuring unit 136, and a bit allocation determining unit 137. The control unit 131 controls the overall transmitting apparatus 100 (such as the transmission-side circuit 111, the reception-side circuit 121, and the like).

The generator unit 132 generates a measurement signal to measure the frequency characteristics obtained between the transmission side and the reception side of the transmitting apparatus 100 (including the transmitting apparatus 150 opposite to the transmitting apparatus 100, and the optical transmission path 141). The measurement signal is transmitted from the transmitting apparatus 100 to the opposing transmitting apparatus 150 and is thereafter fed back to the transmitting apparatus 100 (feedback).

The SNR calculating unit 133 measures an error vector magnitude (EVM) from the shift of constellation of the signal by receiving the fed back measurement signal. The SNR calculating unit 133 calculates the signal to noise ratio (SNR). The SNR calculating unit 133 is configured to calculate the SNR including those of the transmitting apparatus 100, the opposing transmitting apparatus 150, and the optical transmission path 141 while the SNR calculating unit 133 may calculate the carrier wave to noise ratio (CNR) and the channel quality indicator (CQI) not limiting to the calculation of the SNR, and may handle these in combination as transmission characteristics.

The frequency characteristics information storage unit 134 stores therein the frequency characteristics obtained between the transmission side and the reception side of the transmitting apparatus, measured by the SNR calculating unit 133. Every time a measurement signal is sent, the frequency characteristics obtained between the transmission side and the reception side of the transmitting apparatus measured by the SNR calculating unit 133 is stored and the transmission characteristics for each frequency of the corresponding subcarrier is thereby accumulated. The transmission characteristics (such as the SNR) of the subcarriers may be ranked and stored.

In the first embodiment, when the signal of the transmitting apparatus 100 is communicated, the subcarrier selecting unit 135 selects all the subcarriers and allocates the measurement signal thereto. During the operation, the subcarrier selecting unit 135 selects the subcarrier for the data communication. The communication link configuring unit 136 sets the subcarrier to be allocated to the communication link when the signal is communicated and during the operation. The bit allocation determining unit 137 determines the degree of multiple values of the modulated signal to be allocated to each of the subcarriers corresponding to the subcarrier selected by the subcarrier selecting unit 135 and the frequency characteristics obtained between the transmission side and the reception side of the transmitting apparatus 100 and stored in the frequency characteristics information storage unit 134.

The configuration is employed for the transmission-side circuit 111, the reception-side circuit 121, and the control unit 131 to be disposed in the DMT-DSP 101 in the example of the configuration of FIG. 1 while the configuration is not limited to this and, for example, the control unit 131 may be disposed outside the DPS and may include a CPU, a ROM, a RAM, and the like. In this case, the CPU controls the overall transmitting apparatus 100 by executing a control program in the ROM.

FIG. 2 is a diagram of a path for feeding back the measurement signal by the transmitting apparatus according to the first embodiment. In FIG. 2, the same reference numerals are given to the same constituent components as those in FIG. 1. Description will be given of the feedback of the measurement signal MS that is transmitted by the control unit 131 to measure the frequency characteristics obtained between the transmission side and the reception side (including the optical transmission path 141) of the transmitting apparatuses 100 and 150. Hereinafter, description will be made assuming that the transmitting apparatus 100 acts as the transmission side (the optical transmitter) for data and the transmitting apparatus 150 acts as the reception side (the optical receiver) therefor.

The measurement signal MS is generated by the generator unit 132 of the control unit 131. The measurement signal MS is converted into a DMT signal by the DMT modulating unit 114 and is output to the optical transmission path 141 as an optical signal through the IFFT 115, the cyclic prefix appending unit 116, the P/S converting unit 117, the DAC 118, and the TOSA 102. At this time, the measurement signal MS is allocated to all the subcarriers by the control of the control unit 131.

The measurement signal MS is returned as the optical signal to the transmitting apparatus 100 (the feedback) through the reception-side circuit 121 and the transmission-side circuit 111 that are based on the DMT scheme in the opposing transmitting apparatus 150. The opposing transmitting apparatus 150 may have the same configuration as that of the transmitting apparatus 100. The transmitting apparatus 150 has a function of returning the measurement signal MS to the transmitting apparatus 100 through an optical module (the reception-side circuit 121 and the transmission-side circuit 111) when the transmitting apparatus 150 receives the measurement signal MS.

The fed-back measurement signal MS received by the transmitting apparatus 100 is converted into an electrical signal by the ROSA 103, passes through the ADC 122, the S/P 123, the cyclic prefix removing unit 124, and the FFT 125, and is DMT-demodulated by the DMT demodulating unit 126.

The measurement signal MS after the DMT demodulation is output to the SNR calculating unit 133. The SNR calculating unit 133 measures the EVM from the shift of the constellation of the received measurement signal MS to calculate the SNR. The EVM indicates the degree of shifting from an ideal point of the constellation and indicates the modulation precision of a digital modulated wave. The SNR of each of the subcarriers measured by the SNR calculating unit 133 is stored to the frequency characteristics information storage unit 134. In this manner, the transmission characteristics (the SNR) between the transmitting apparatuses 100 and 150 on the transmission side and the reception side, including the optical transmission path 141 may be measured by feeding back the measurement signal MS to the transmitting apparatus 100.

After the communication of the signal (during the operation), the control unit 131 using the communication link configuring unit 136 refers to the frequency characteristics stored in the frequency characteristics information storage unit 134. The communication link configuring unit 136 extracts a subcarrier having excellent frequency characteristics from the plural subcarriers and allocates the subcarrier having excellent frequency characteristics to the communication link. The bit allocation determining unit 137 allocates the number of bits of the data for each of the subcarriers to be allocated to the data signal.

Figure 3A:
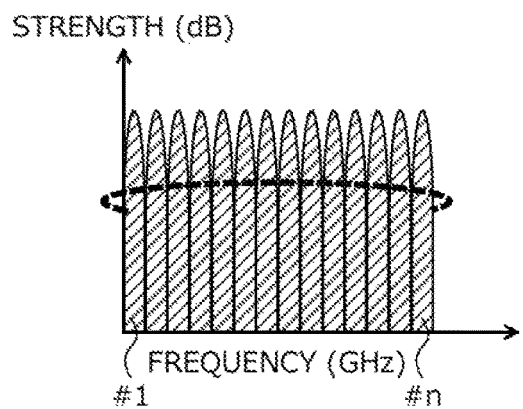
FIGS. 3A, 3B, and 3C are diagrams of a configuration state of subcarriers allocated to a communication link by the transmitting apparatus according to the first embodiment.
Figure 3B:
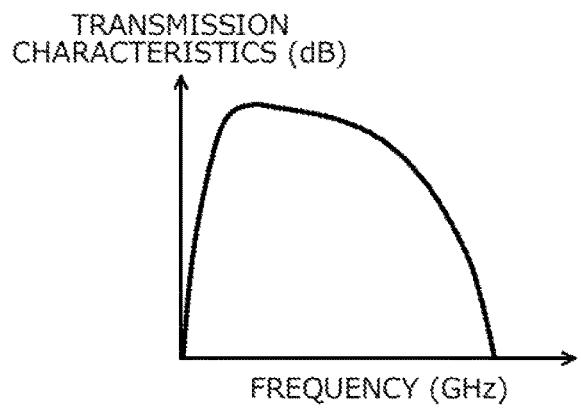
Figure 3C:
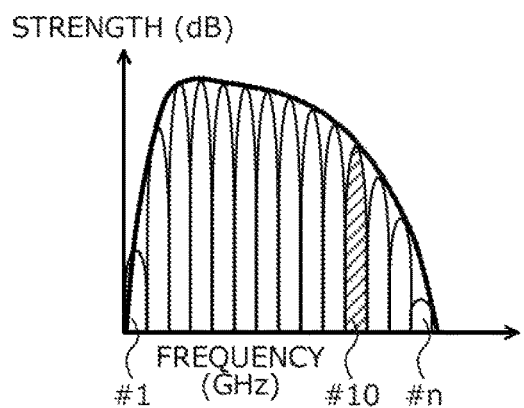

FIGS. 3A, 3B, and 3C are diagrams of the configuration state of the subcarriers allocated to the communication link by the transmitting apparatus according to the first embodiment. FIG. 3A depicts the strength of each of the subcarriers. The horizontal axis represents the frequency and the vertical axis represents the strength. The transmitting apparatus 100, based on the DMT scheme, divides a predetermined frequency band into n pieces at constant frequency intervals to use the frequency band. The divided subcarriers are depicted with subcarrier numbers #1 to #n.

FIG. 3B depicts the frequency characteristics including those of the optical transmitter, the optical receiver, and the line path. FIG. 3B depicts the frequency characteristics obtained by using the above measurement signal MS, and the horizontal axis represents the frequency and the vertical axis represents the transmission characteristics (SNR). FIG. 3C depicts the strength of each of the subcarriers after passing through the frequency characteristics, and the horizontal axis represents the frequency and the vertical axis represents the strength. FIG. 3C depicts the strength of each of the carriers including also the transmitting apparatuses 100 and 150, and the optical transmission path 141.

In the first embodiment, as depicted in FIG. 3A, when the signal communication of the transmitting apparatus 100 is started up, the control unit 131 (the subcarrier selecting unit 135) allocates all the subcarriers (#1 to #n) to the communication link.

At this time, the control unit 131 transmits the measurement signal MS to the opposing transmitting apparatus 150 using all the subcarriers (#1 to #n) allocated to the communication link. The measurement signal MS is fed back from the opposing transmitting apparatus 150.

The control unit 131 of the transmitting apparatus 100 thereafter configures the subcarrier to be allocated to the communication link based on the frequency characteristics of each of the subcarriers (#1 to #n) depicted in FIG. 3B. In the example of FIG. 3C, a state is depicted in which the subcarrier (#10) that has excellent transmission characteristics (with which the communication can be executed reliably) and whose effect on the transmission capacity is the least is allocated to the communication link. For example, the subcarrier #10 having the best transmission characteristics is the subcarrier with which a high degree of multiple values of the modulated signal necessary for the data communication may be allocated and therefore, the effect on transmission capacity may be reduced by not allocating the subcarrier#10 as the communication link.

FIG. 4 is a flowchart of a procedure of configuring the subcarrier to be allocated to the communication link, executed by the transmitting apparatus according to the first embodiment. FIG. 4 depicts the procedure for the configuration executed by the control unit 131 when the signal communication of the transmitting apparatus 100 is started up under an actual environment in which the transmitting apparatus 100 is disposed and is connected to the optical transmission path 141.

The control unit 131, using the subcarrier selecting unit 135, first allocates all the subcarriers (#1 to #n) to the communication link (step S401). The control unit 131 transmits the measurement signal MS to the opposing transmitting apparatus 150 using all the subcarriers (#1 to #n) (step S402).

The control unit 131 obtains the transmission characteristics (frequency characteristics) of each of the transmitting apparatus 100, the opposing transmitting apparatus 150, and the optical transmission path 141 based on the measurement signal MS fed back from the opposing transmitting apparatus 150 (step S403). At this time, the control unit 131 stores the obtained frequency properties to the frequency characteristics information storage unit 134.

The control unit 131 determines strength based on the obtained frequency characteristics information (step S404). For example, the SN ratio, the EVM, the error rate, or the like is used for the strength determination. The reason for the strength determination is to allocate a subcarrier having a high strength to the communication link.

When a subcarrier having a high strength is simply allocated to the communication link, the subcarrier capable of increasing the bit number to be allocated is allocated to the communication link and the data transmission capacity is reduced by the amount corresponding to the above. Therefore, a subcarrier having excellent transmission characteristics and least affecting the transmission capacity is allocated to the communication link. To execute this allocation, the subcarrier to be allocated to the communication link is selected based on the strength determination.

The control unit 131, using the communication link configuring unit 136, determines the subcarrier to be allocated to the communication link during the operation after the communication of the signal (step S405). The control unit 131 configures, as data communication subcarriers, subcarriers other than the one allocated to the communication link (step S406) and causes the processing to come to an end. In the example of FIGS. 3A, 3B, and 3C, the subcarrier (#10) is allocated to the communication link and the subcarriers (#1 to #9 and #11 to #n) are configured to be the data communication subcarriers.

According to the first embodiment, a subcarrier having excellent transmission characteristics and least affecting the transmission capacity may be allocated to the subcarrier of the communication link by measuring the transmission characteristics obtained between the transmitting apparatus and the opposing transmitting apparatus using the measuring signal. The transmitting apparatus may easily and quickly measure the actual transmission characteristics of each of the transmitting apparatus and the opposing transmitting apparatus as well as that between the transmitting apparatus and the other transmitting apparatus opposite thereto by using the feedback of the measurement signal from the opposite transmitting apparatus, obtained by transmitting the measurement signal. The communication link between the transmitting apparatus and the opposing transmitting apparatus may thereby be secured and the signal may be communicated between the transmitting apparatuses when the transmitting apparatus is started up. In the first embodiment, the measurement signal is sent using all the subcarriers as the communication link and therefore, the transmission characteristics may be measured in one processing session.

A second embodiment will be described. The same configuration as that of FIG. 1 may be used for each of the transmitting apparatuses 100 in the second to fifth embodiments described below. In the second embodiment, the control unit 131 allocates the subcarriers to the communication link sequentially from a low frequency subcarrier when the signal communication of the transmitting apparatus is started up.

Figure 5A:
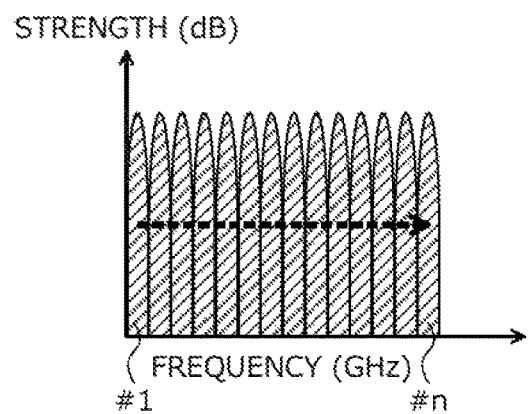
FIGS. 5A, 5B, and 5C are diagrams of a configuration state of subcarriers to be allocated to the communication link by the transmitting apparatus according to a second embodiment.
Figure 5B:
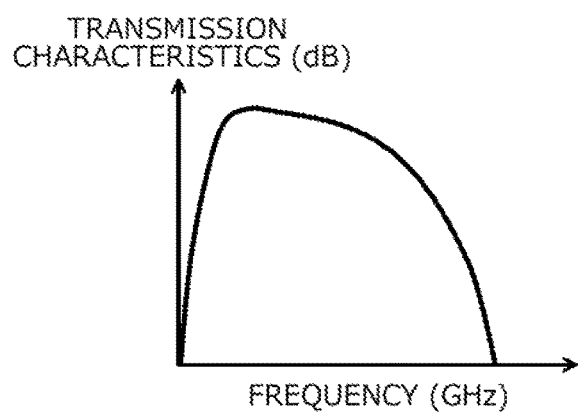
Figure 5C:
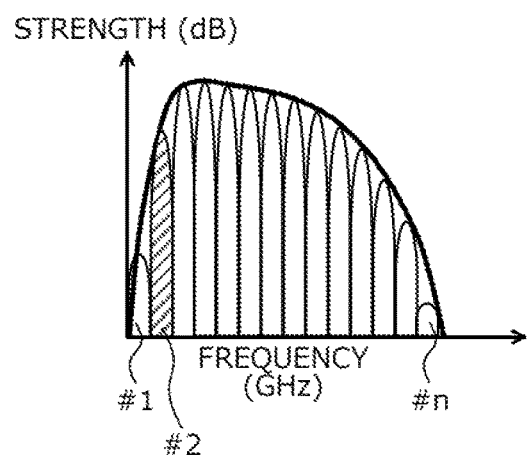

FIGS. 5A, 5B, and 5C are diagrams of the configuration state of the subcarriers to be allocated to the communication link by the transmitting apparatus according to the second embodiment. FIG. 5A depicts the strength of each of the subcarriers. As depicted in FIG. 5A, when the signal communication of the transmitting apparatus is started up, the subcarrier selecting unit 135 allocates each of the subcarriers to the communication link sequentially from the subcarrier (#1) at a low frequency to the subcarrier (#n) at a high frequency.

At this time, the control unit 131 transmits the measurement signal MS using the one subcarrier (#1) allocated to the communication link. The transmission characteristics depicted in FIG. 5B represent the frequency characteristics obtained after the measurement signal is transmitted using all the subcarriers (#1 to #n).

The control unit 131 thereafter configures the subcarrier to be allocated to the communication link, based on the frequency characteristics of each of the subcarriers (#1 to #n) depicted in FIG. 5B. In the example of the strength of each of the subcarriers after passing through the frequency characteristics of FIG. 5C, a state is described in which the subcarrier #2 having excellent transmission characteristics and least affecting the transmission capacity is allocated to the communication link.

Figure 6:
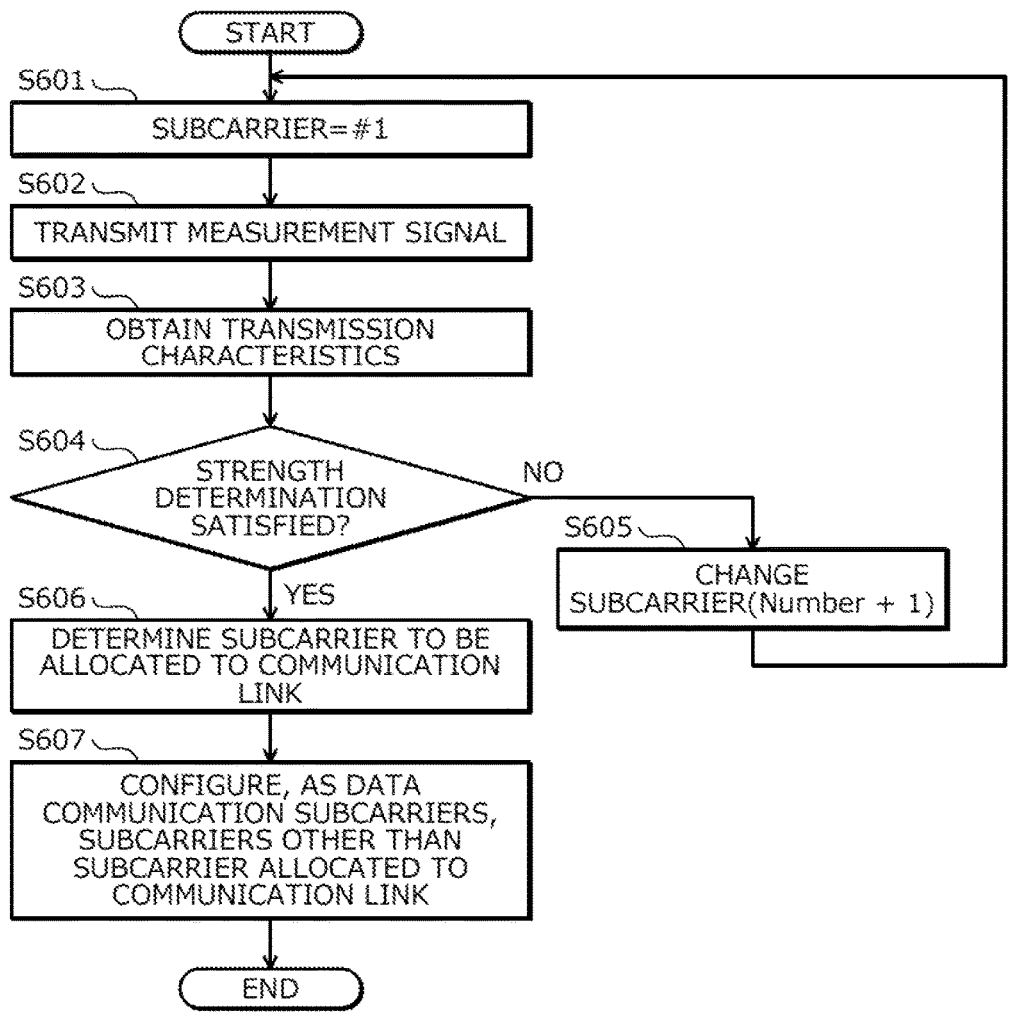
FIG. 6 is a flowchart of a procedure of configuring a subcarrier to be allocated to the communication link, executed by the transmitting apparatus according to the second embodiment.

FIG. 6 is a flowchart of a procedure of configuring the subcarrier to be allocated to the communication link, executed by the transmitting apparatus according to the second embodiment. FIG. 6 depicts the procedure for the configuration executed by the control unit 131 when the signal communication of the transmitting apparatus 100 is started up under an actual environment in which the transmitting apparatus 100 is disposed and is connected to the optical transmission path 141.

The control unit 131, using the subcarrier selecting unit 135, first allocates the one subcarrier (#1) at the lowest frequency to the communication link (step S601). The control unit 131 transmits the measurement signal MS to the opposing transmitting apparatus 150, using the allocated one subcarrier (step S602).

The control unit 131 obtains the transmission characteristics (the frequency characteristics) of each of the transmitting apparatus 100, the opposing transmitting apparatus 150, and the optical transmission path 141, based on the measurement signal MS fed back from the opposing transmitting apparatus 150 (step S603). At this time, the control unit 131 stores the obtained frequency characteristics to the frequency characteristics information storage unit 134.

The control unit 131 determines strength based on the obtained frequency characteristics information (step S604). When the strength determination is not satisfied (step S604: NO), the control unit 131 increments (+1) the subcarrier number (step S605) and repeats the operations at step S601 to step S604 for the next subcarrier (#2 is subsequent to #1).

When the strength determination is satisfied (step S604: YES), the control unit 131 executes the operation at step S606. The condition to satisfy the strength determination is, for example, that the subcarrier is a subcarrier that has excellent transmission characteristics and that affects transmission capacity the least.

The control unit 131, using the communication link configuring unit 136, thereafter determines the subcarrier to be allocated to the communication link during the operation after the signal communication (step S606). The control unit 131 configures the subcarriers other than the one allocated to the communication link to be data communication subcarriers (step S607) and causes the processing to come to an end. In the example of FIGS. 5A, 5B, and 5C, the subcarrier (#2) is allocated to the communication link and the subcarriers (#1 and #3 to #n) are configured to be the data communication subcarriers.

According to the second embodiment, effects identical to those of the first embodiment are achieved. According to the second embodiment, the transmission characteristics may be measured for each of the subcarriers because the subcarriers are selected one by one sequentially from the low frequency side and the measurement signal is sent thereby. The processing may be caused to come to an end in a short time when a subcarrier having excellent transmission characteristics is present on the low frequency side to be able to satisfy the strength determination.

A third embodiment will be described. In the third embodiment, similar to the second embodiment, the control unit 131 allocates the subcarriers to the communication link sequentially from a low frequency subcarrier when the signal communication of the transmitting apparatus is started up.

Figure 7A:
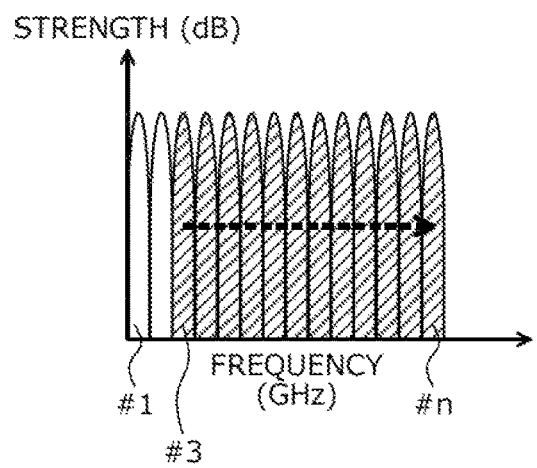
FIGS. 7A, 7B, and 7C are diagrams of a configuration state of subcarriers to be allocated to the communication link by the transmitting apparatus according to a third embodiment.
Figure 7B:
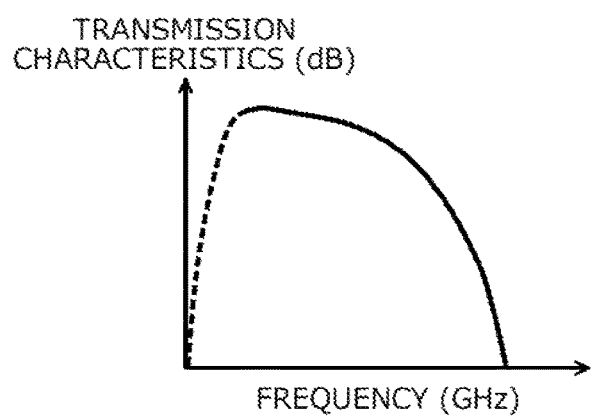
Figure 7C:
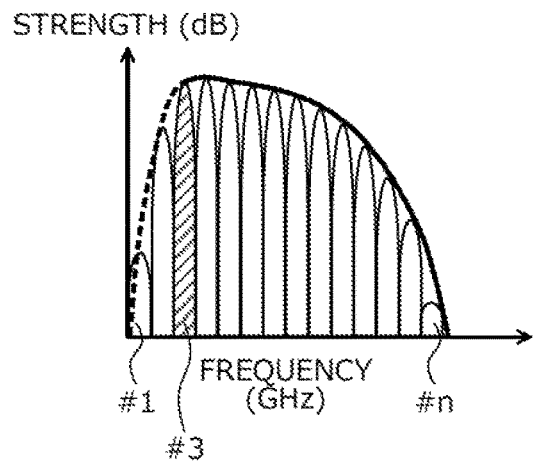

FIGS. 7A, 7B, and 7C are diagrams of the configuration state of the subcarriers to be allocated to the communication link by the transmitting apparatus according to the third embodiment. FIG. 7A depicts the strength of each of the subcarriers. As depicted in FIG. 7A, when the signal communication of the transmitting apparatus is started up, the subcarrier selecting unit 135 allocates one of the subcarriers to the communication link sequentially from the subcarrier on the low frequency side and not affected by the MPI in the optical region, to the subcarrier (#n) at a high frequency.

At this time, the control unit 131 transmits the measurement signal MS using the one subcarrier (#3) allocated to the communication link. The transmission characteristics depicted in FIG. 7B represent the frequency characteristics obtained after the measurement signal is transmitted using each of the subcarriers (#1 to #n).

The control unit 131 thereafter configures the subcarrier to be allocated to the communication link, based on the frequency characteristics of all of the subcarriers (#1 to #n) depicted in FIG. 7B and obtained by the measurement signal MS. In the example of FIG. 7C, a state is described in which the subcarrier #2 having excellent transmission characteristics and minimally affecting the transmission capacity is allocated to the communication link.

Figure 8:
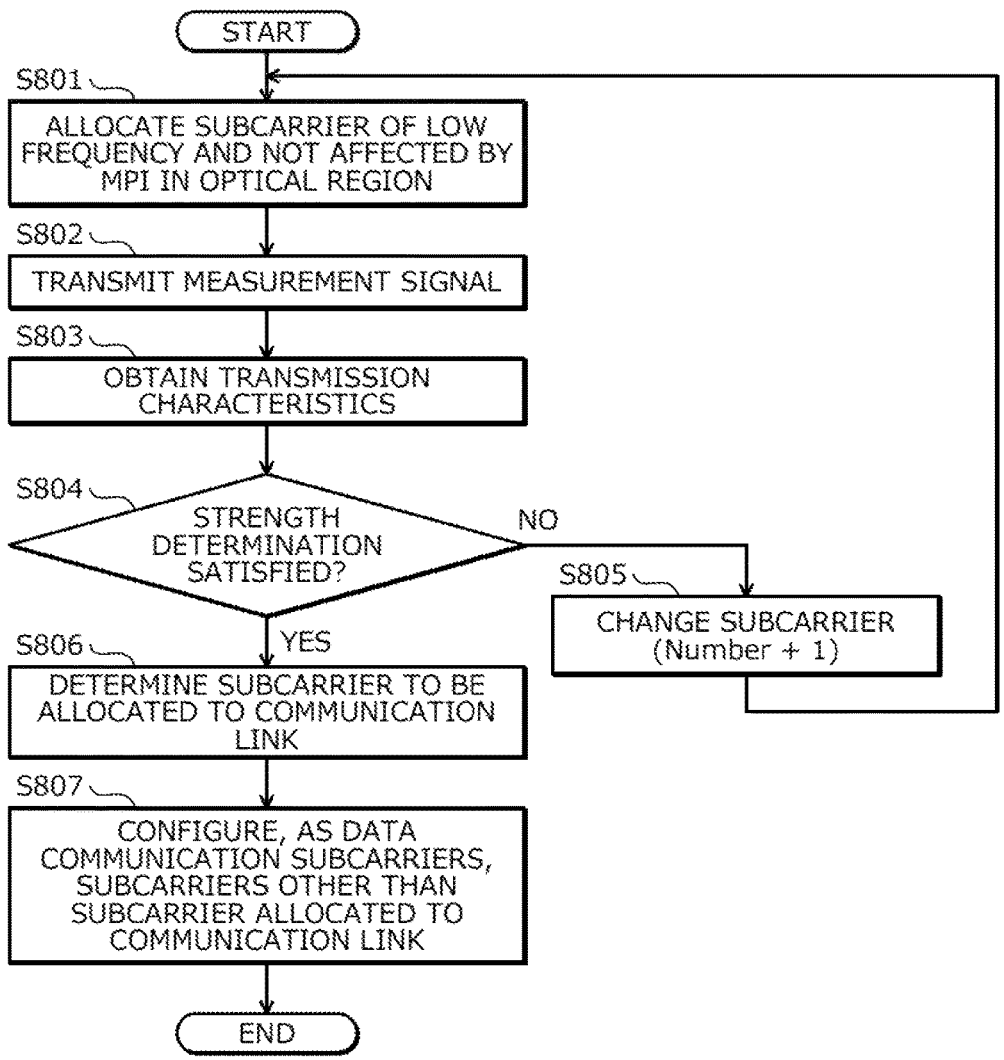
FIG. 8 is a flowchart of a procedure of configuring a subcarrier to be allocated to the communication link, executed by the transmitting apparatus according to the third embodiment.

FIG. 8 is a flowchart of a procedure of configuring the subcarrier to be allocated to the communication link, executed by the transmitting apparatus according to the third embodiment. FIG. 8 depicts the procedure for the configuration executed by the control unit 131 when the signal communication of the transmitting apparatus 100 is started up under an actual environment in which the transmitting apparatus 100 is disposed and is connected to the optical transmission path 141.

The control unit 131, using the subcarrier selecting unit 135, first allocates to the communication link, one subcarrier (#3 in the example depicted in FIGS. 7A, 7B, and 7C) not affected by the MPI in the optical region among the subcarriers on the low frequency side (step S801). The control unit 131 transmits the measurement signal MS to the opposing transmitting apparatus 150, using the allocated one subcarrier (step S802).

The control unit 131 obtains the transmission characteristics (the frequency characteristics) of each of the transmitting apparatus 100, the opposing transmitting apparatus 150, and the optical transmission path 141, based on the measurement signal MS fed back from the opposing transmitting apparatus 150 (step S803). At this time, the control unit 131 stores the obtained frequency characteristics to the frequency characteristics information storage unit 134.

The control unit 131 determines strength based on the obtained frequency characteristics information (step S804). When the strength determination is not satisfied (step S804: NO), the control unit 131 increments (+1) the subcarrier number (step S805) and repeats the operations at step S801 to step S804 for the next subcarrier (#4 is subsequent to #3).

When the strength determination is satisfied (step S804: YES), the control unit 131 executes the operation at step S806. The condition to satisfy the strength determination is, for example, that the subcarrier is a subcarrier that has excellent transmission characteristics and that affects transmission capacity the least.

The control unit 131, using the communication link configuring unit 136, thereafter determines the subcarrier to be allocated to the communication link during the operation after the signal communication (step S806). The control unit 131 configures the subcarriers other than the one allocated to the communication link to be data communication subcarriers (step S807) and causes the processing to come to an end. In the example of FIGS. 7A, 7B, and 7C, the subcarrier (#2) is allocated to the communication link and the subcarriers (#1 to #2, #4 to #n) are configured to be the data communication subcarriers.

According to the third embodiment, effects identical to those of the second embodiment are achieved. According to the third embodiment, the transmission characteristics may be measured for each of the subcarriers because the subcarriers are selected one by one sequentially from the low frequency side and the measurement signal is sent thereby. The processing may be caused to come to an end in a short time when a subcarrier having excellent transmission characteristics is present on the low frequency side to be able to satisfy the strength determination. Further, according to the third embodiment, the subcarrier not affected by the MPI in the optical region may be allocated to the communication link.

A fourth embodiment will be described. In the fourth embodiment, the control unit 131 allocates the subcarriers to the communication link sequentially from a high frequency subcarrier when the signal communication of the transmitting apparatus is started up.

Figure 9A:
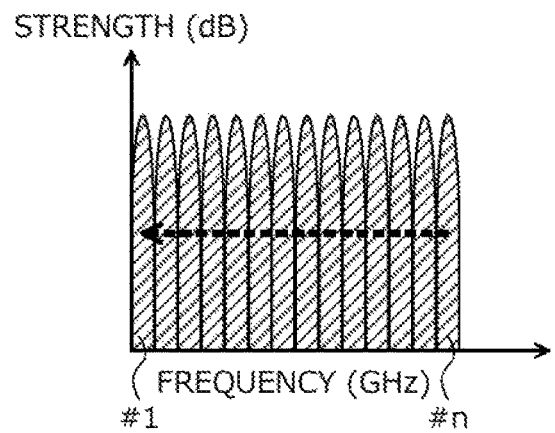
FIGS. 9A, 9B, and 9C are diagrams of a configuration state of subcarriers to be allocated to the communication link by the transmitting apparatus according to a fourth embodiment.
Figure 9B:
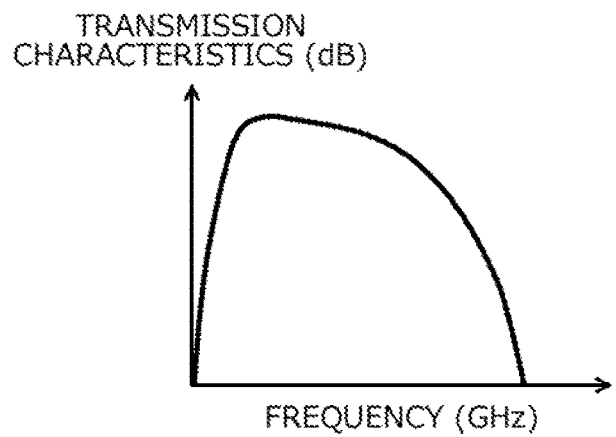
Figure 9C:
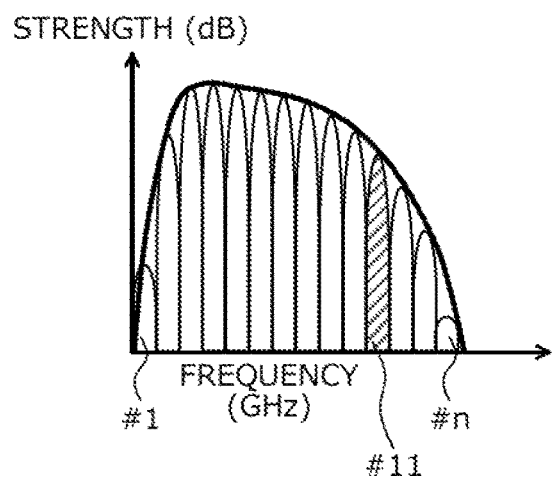

FIGS. 9A, 9B, and 9C are diagrams of the configuration state of the subcarriers to be allocated to the communication link by the transmitting apparatus according to the fourth embodiment. FIG. 9A depicts the strength of each of the subcarriers. As depicted in FIG. 9A, when the signal communication of the transmitting apparatus is started up, the subcarrier selecting unit 135 sequentially allocates one of the subcarriers to the communication link from the subcarrier (#n) at a high frequency to the subcarrier (#1) at a low frequency.

At this time, the control unit 131 transmits the measurement signal MS using the one subcarrier (#n) allocated to the communication link. The transmission characteristics depicted in FIG. 9B represent the frequency characteristics obtained after the measurement signal is transmitted using each of the subcarriers (#n to #1 ).

The control unit 131 thereafter configures the subcarrier to be allocated to the communication link, based on the frequency characteristics of each of the subcarriers (#n to #1) depicted in FIG. 9B. In the example of FIG. 9C, the state is described in which the subcarrier #11 having excellent transmission characteristics and minimally affecting the transmission capacity is allocated to the communication link.

Figure 10:
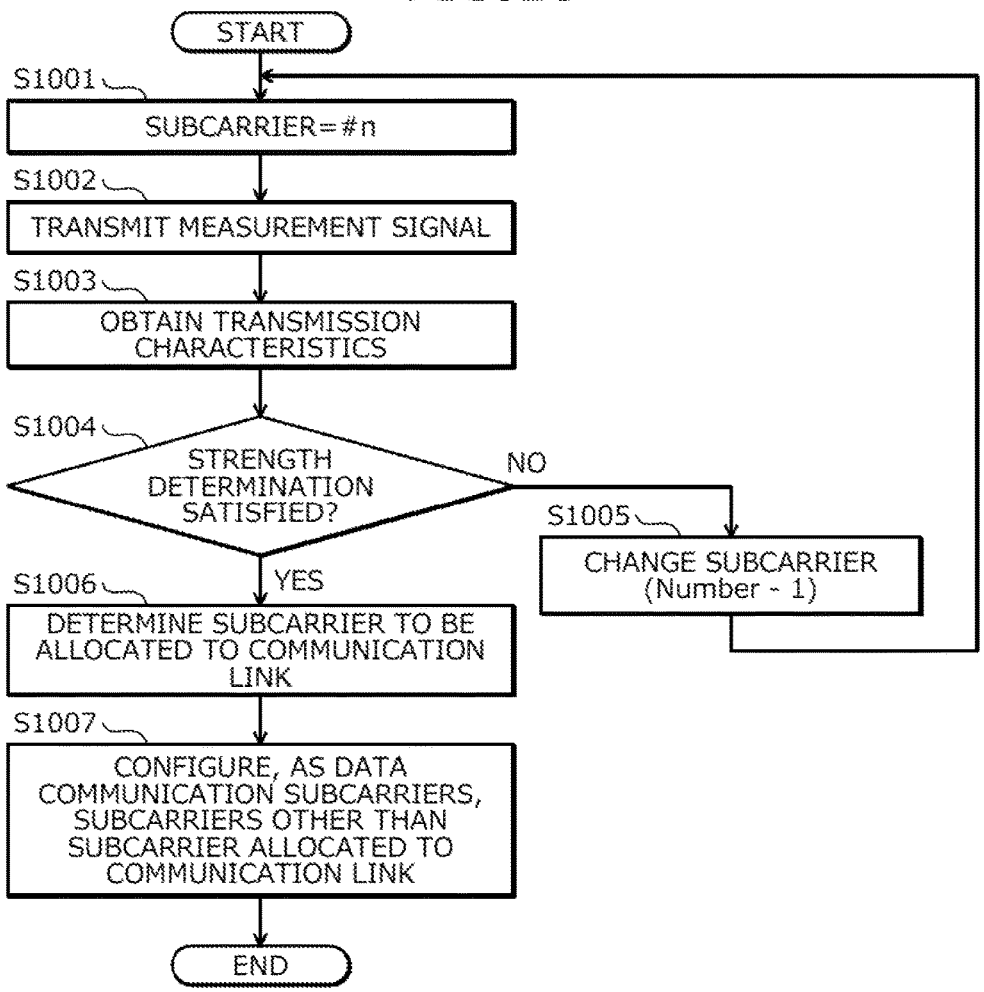
FIG. 10 is a flowchart of a procedure of configuring a subcarrier to be allocated to the communication link, executed by the transmitting apparatus according to the fourth embodiment.

FIG. 10 is a flowchart of a procedure of configuring the subcarrier to be allocated to the communication link, executed by the transmitting apparatus according to the fourth embodiment. FIG. 10 depicts the procedure for the configuration executed by the control unit 131 when the signal communication of the transmitting apparatus 100 is started up under an actual environment in which the transmitting apparatus 100 is disposed and is connected to the optical transmission path 141.

The control unit 131, using the subcarrier selecting unit 135, first allocates the one subcarrier (#n) at the highest frequency to the communication link (step S1001). The control unit 131 transmits the measurement signal MS to the opposing transmitting apparatus 150, using the allocated one subcarrier (step S1002).

The control unit 131 obtains the transmission characteristics (the frequency characteristics) of each of the transmitting apparatus 100, the opposing transmitting apparatus 150, and the optical transmission path 141, based on the measurement signal MS fed back from the opposing transmitting apparatus 150 (step S1003). At this time, the control unit 131 stores the obtained frequency characteristics to the frequency characteristics information storage unit 134.

The control unit 131 determines strength based on the obtained frequency characteristics information (step S1004). When the strength determination is not satisfied (step S1004: NO), the control unit 131 decrements (−1) the subcarrier number (step S1005) and repeats the operations at step S1001 to step S1004 for the next subcarrier (#n−1 is subsequent to #n).

When the strength determination is satisfied (step S1004: YES), the control unit 131 executes the operation at step S1006. The condition to satisfy the strength determination is, for example, that the subcarrier is a subcarrier that has excellent transmission characteristics and that minimally affects transmission capacity.

The control unit 131, using the communication link configuring unit 136, thereafter determines the subcarrier to be allocated to the communication link during the operation after the signal communication (step S1006). The control unit 131 configures the subcarriers other than the one allocated to the communication link to be data communication subcarriers (step S1007) and causes the processing to come to an end. In the example of FIGS. 9A, 9B, and 9C, the subcarrier (#11) is allocated to the communication link and the subcarriers (#1 to #10, #12 to #n) are configured to be the data communication subcarriers.

According to the fourth embodiment, effects identical to those of the first embodiment are achieved. According to the fourth embodiment, the transmission characteristics may be measured for each of the subcarriers because the subcarriers are selected one by one sequentially from the high frequency side and the measurement signal is sent thereby. The processing may be caused to come to an end in a short time when a subcarrier having excellent transmission characteristics is present on the low frequency side to be able to satisfy the strength determination.

A fifth embodiment will be described. In the fifth embodiment, the control unit 131 allocates arbitrary plural subcarriers to the communication link when the signal communication of the transmitting apparatus is started up.

Figure 11A:
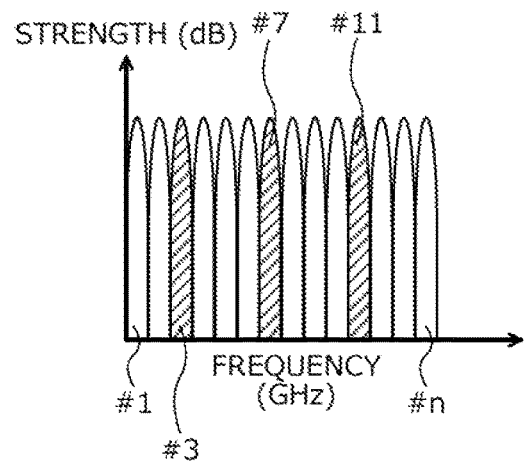
FIGS. 11A, 11B, and 11C are diagrams of a configuration state of subcarriers allocated to the communication link by the transmitting apparatus according to a fifth embodiment.
Figure 11B:
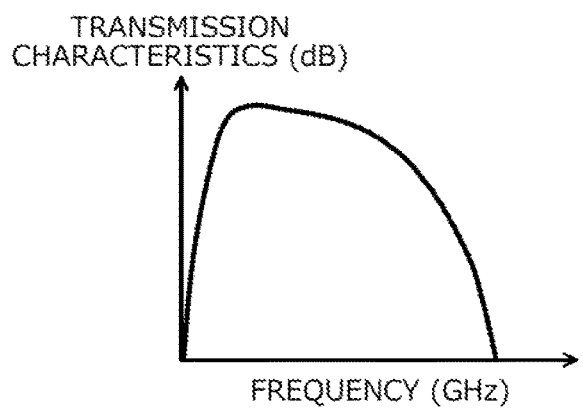

FIGS. 11A, 11B, and 11O are diagrams of the configuration state of the subcarriers allocated to the communication link by the transmitting apparatus according to the fifth embodiment. FIG. 11A depicts the strength of each of the subcarriers. As depicted in FIG. 11A, when the signal communication of the transmitting apparatus is started up, the subcarrier selecting unit 135 allocates arbitrary subcarriers (#3, #7, and #11) to the communication link.

In the depicted example, the plural subcarriers to be allocated to the communication link are simultaneously selected and include one for a low frequency, one for an intermediate frequency (the frequency that is intermediate between the low frequency and a high frequency), and one for a high frequency. Not limiting to this, one subcarrier at an arbitrary frequency may be selected in one selection session and another subcarrier at a frequency different therefrom may be selected in the next selection session (a subcarrier at a frequency that is not neighboring the frequency of the subcarrier selected in the previous selection session).

At this time, the control unit 131 transmits the measurement signal MS using the subcarriers (#3, #7, and #11) allocated to the communication link. After one transmission of the measurement signal MS, allocation of different subcarriers (for example, subcarriers #4, #8, and #12 between #3, #7, and #11 that are already measured) to the communication link and the transmission of the measurement signal MS are repeated. The transmission characteristics depicted in FIG. 11B represent the frequency characteristics obtained after the measurement signal is transmitted using each of the subcarriers (#1 to #n).

Figure 11C:
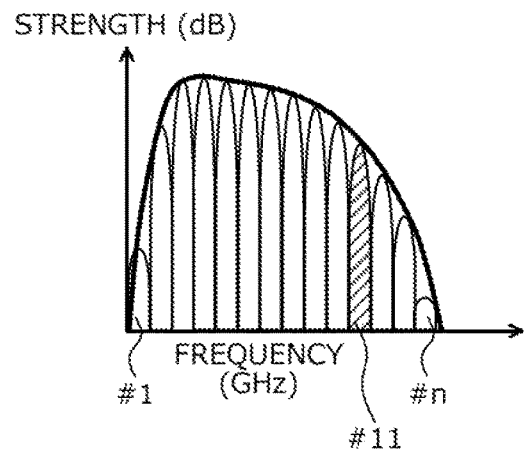

The control unit 131, at the time of operation after signal communications, configures the subcarrier to be allocated to the communication link, based on the frequency characteristics of each of the subcarriers (#n to #1) depicted in FIG. 11B. In the example of the strength of each of the subcarriers after passing through the frequency characteristics of FIG. 11C, a state is described in which the subcarrier #11 having excellent transmission characteristics and least affecting the transmission capacity is allocated to the communication link.

Figure 12:
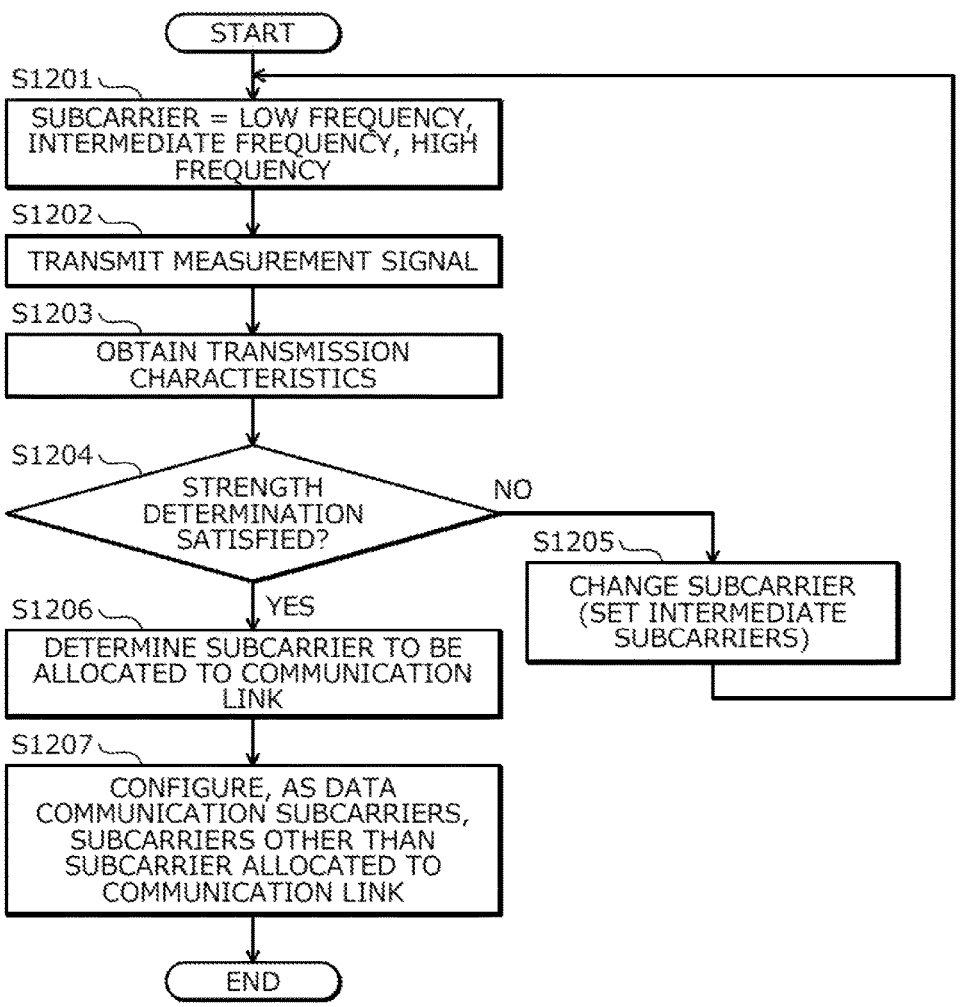
FIG. 12 is a flowchart of a procedure of configuring a subcarrier to be allocated to the communication link, executed by the transmitting apparatus according to the fifth embodiment.

FIG. 12 is a flowchart of a procedure of configuring the subcarrier to be allocated to the communication link, executed by the transmitting apparatus according to the fifth embodiment. FIG. 12 depicts the procedure for the configuration executed by the control unit 131 when the signal communication of the transmitting apparatus 100 is started up under an actual environment in which the transmitting apparatus 100 is disposed and is connected to the optical transmission path 141.

The control unit 131, using the subcarrier selecting unit 135, first allocates plural subcarriers (in the example depicted in FIGS. 11A, 11B, and 110, #3 of a low frequency, #7 of an intermediate frequency, and #11 of a high frequency) to the communication link (step S1201). The control unit 131 transmits the measurement signal MS to the opposing transmitting apparatus 150, using the allocated plural subcarriers (step S1202).

The control unit 131 obtains the transmission characteristics (the frequency characteristics) of each of the transmitting apparatus 100, the opposing transmitting apparatus 150, and the optical transmission path 141, based on the measurement signal MS fed back from the opposing transmitting apparatus 150 (step S1203). At this time, the control unit 131 stores the obtained frequency characteristics to the frequency characteristics information storage unit 134.

The control unit 131 determines strength based on the obtained frequency characteristics information (step S1204). When the strength determination is not satisfied (step S1204: NO), the control unit 131 changes the subcarrier number to be selected next (subcarriers #4, #8, and #12 between #3, #7, and #11 that are already measured) (step S1205) and repeats the operations at step S1201 to step S1204 for the changed subcarriers (subcarriers #4, #8, and #12).

When the strength determination is satisfied (step S1204: YES), the control unit 131 executes the operation at step S1206. The condition to satisfy the strength determination is, for example, that the subcarrier is a subcarrier that has excellent transmission characteristics and that affects transmission capacity the least.

The control unit 131, using the communication link configuring unit 136, thereafter determines the subcarrier to be allocated to the communication link during the operation after the signal communication (step S1206). The control unit 131 configures the subcarriers other than the one allocated to the communication link to be data communication subcarriers (step S1207) and causes the processing to come to an end. In the example of FIGS. 11A, 11B, and 110, the subcarrier (#11) is allocated to the communication link and the subcarriers (#1 to #10, #12 to #n) are configured to be the data communication subcarriers.

According to the fifth embodiment, effects identical to those of the first embodiment are achieved. According to the fifth embodiment, the transmission characteristics may be measured for each of the subcarriers because an arbitrary frequency side is selected sequentially and the measurement signal is sent thereby. The processing may be caused to come to an end in a short time when a subcarrier having excellent transmission characteristics is present on the selected arbitrary frequency side to be able to satisfy the strength determination.

Figure 13A:
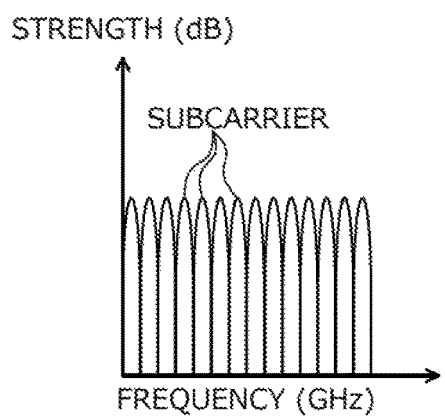
FIGS. 13A, 13B, and 13C are explanatory diagrams of a principle of a DMT scheme.
Figure 13B:
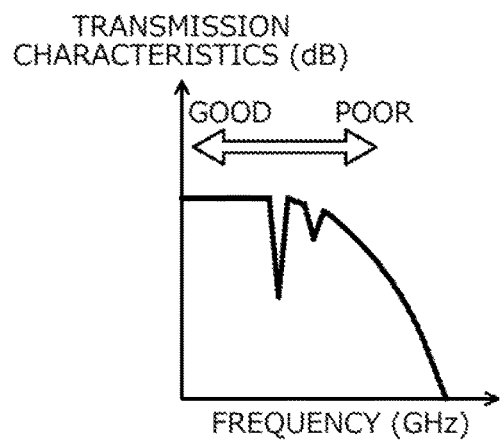
Figure 13C:
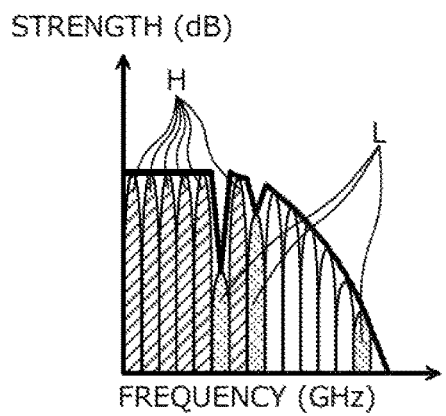

Various types of control based on the DMT scheme executed by the transmitting apparatus 100 described in the embodiments will be described. FIGS. 13A, 13B, and 13C are explanatory diagrams of a principle of the DMT scheme.

Under the DMT scheme, a negotiation (bit/power mapping for each of the subcarriers) is executed to optimize the transmission capacity according to the frequency characteristics including those of the optical transmitter, the optical receiver, and the line path, for each of the subcarriers having frequencies that are different from each other.

As depicted in FIG. 13A, the plural subcarriers have the strengths for each frequency (the horizontal axis represents the frequency and the vertical axis represents the strength). FIG. 13B depicts the frequency characteristics obtained when the transmitting apparatus 100 transmits this subcarrier, and the horizontal axis represents the frequency and the vertical axis represents the transmission characteristics (for example, the SNR).

As depicted in FIG. 13B, the frequency characteristics are degraded more the higher frequency is by including therein the characteristics of the transmitting apparatus 150 that is opposite to the transmitting apparatus 100 and the characteristics of the optical transmission path 141. The SNR may be degraded at some frequencies such as the intermediate frequency. Especially, for the low-cost transmitting apparatuses 100 and 150, the frequency characteristics are degraded more at a higher frequency.

Under the DMT scheme, the degree of multiple values of the modulated signal to be allocated to each of the subcarriers is varied corresponding to the transmission characteristics. The transmission capacity may be increased for each of the low-cost transmitting apparatuses 100 and 150 whose bands are not extended to a high frequency as depicted in FIG. 13B.

FIG. 13C is a diagram of the strength of each of the subcarriers after passing through the frequency characteristics. For each of the subcarriers in a group H having excellent frequency characteristics, the control unit 131 (the bit allocation determining unit 137) allocates a higher degree of multiple values of the modulated signal to be allocated to each of the subcarriers (in the depicted example, for example, 64 QAM). On the other hand, for each of the subcarriers in a group L each having degraded frequency characteristics, the control unit 131 (the bit allocation determining unit 137) allocates a lower degree of multiple values of the modulated signal to be allocated to each of the subcarriers (in the depicted example, for example, 4 QAM).

FIG. 14 is an explanatory diagram of the communication link of the transmitting apparatus based on the DMT scheme. The transmitting apparatus 100 based on the DMT scheme is directly connected to the opposing transmitting apparatus 150 in point-to-point connection through the optical transmission path 141 such as a transmission fiber. The transmitting apparatuses 100 and 150 each includes an optical transmitting unit Tx (the transmission-side circuit 111 and the optical transmitting unit 102) and an optical receiving unit Rx (the reception-side circuit 121 and the optical receiving unit 103).

The transmitting apparatus 100 allocates an arbitrarily set subcarrier to the communication link L (a link communication channel) from the plural subcarriers and, after securing the communication link with opposing transmitting apparatus 150, executes a negotiation (the bit/power mapping for each of the subcarriers).

Using the communication link, the transmitting apparatus 100 sends the reception state of the optical receiving unit Rx (the reception-side circuit 121) to the optical transmitting unit Tx (the transmission-side circuit 111) of the opposing transmitting apparatus 150 also during the operation. The transmitting apparatus 100 thereby monitors variation of the characteristics including those of the transmitting apparatus 100, the opposing transmitting apparatus 150 (the optical transmitter and the optical receiver), and the optical transmission path 141. The transmitting apparatus 100 monitors circumstances such that a negotiation may again be executed to optimize the transmission capacity corresponding to variation of the characteristics.

As to the communication link between the transmission side and the reception side, the transmitting apparatus 100, based on the DMT scheme, therefore has to allocate the subcarrier having excellent transmission characteristics (with which the communication may be executed reliably) as the subcarrier for the communication link, including the time when the signal communication is started up, as described in the embodiments.

Figure 15A:
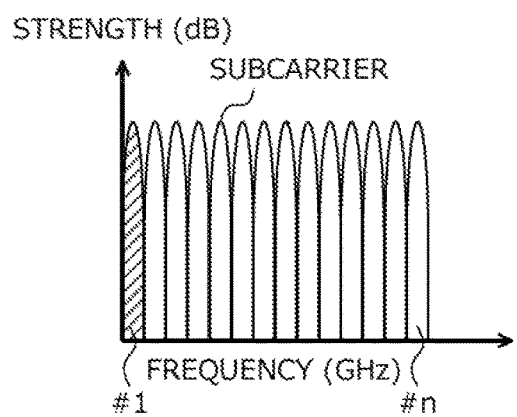
FIGS. 15A, 15B, and 15C are diagrams of a configuration state of a subcarrier for comparison with the embodiments.
Figure 15B:
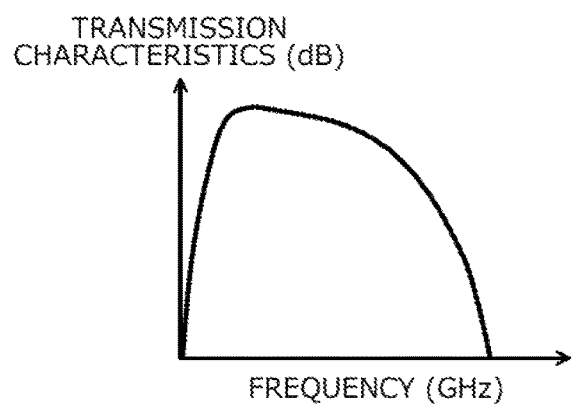
Figure 15C:
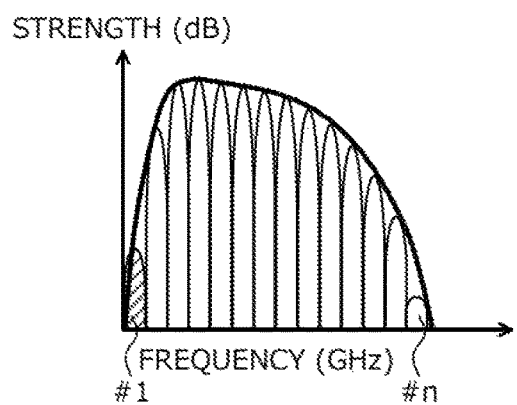

FIGS. 15A, 15B, and 15C are diagrams of a configuration state of the subcarrier for comparison with the embodiments. FIG. 15A depicts the strength of each of the subcarriers. FIG. 15B depicts the transmission characteristics. FIG. 15C depicts the strength of each of the subcarriers after passing through the frequency characteristics.

The configuration of the communication link in the current state will be described. The transmitting apparatus 100 applied to the DMT scheme is a low-cost apparatus and, even when the strength of each of the subcarriers is set to be a specific strength as depicted in FIG. 15A, flat characteristics cannot be obtained and the band cannot be extended to a high frequency in the actual transmission as depicted in FIG. 15B. Because the frequency characteristics vary for each of the transmitting apparatuses 100 (the constituent apparatus), a subcarrier having a poor SN may be allocated to the communication link when a predetermined subcarrier at a high frequency is fixed to be allocated to the communication link.

On the other hand, as depicted in FIG. 15C, when a predetermined subcarrier at a low frequency with which a predetermine SN may be obtained, for example, the subcarrier #1 is fixedly allocated and configured as the communication link, the communication link may not be secured due to the effects of the MPI in the optical region and the effects of the transmission characteristics (such as the reflection by optical connectors).

Figure 16:
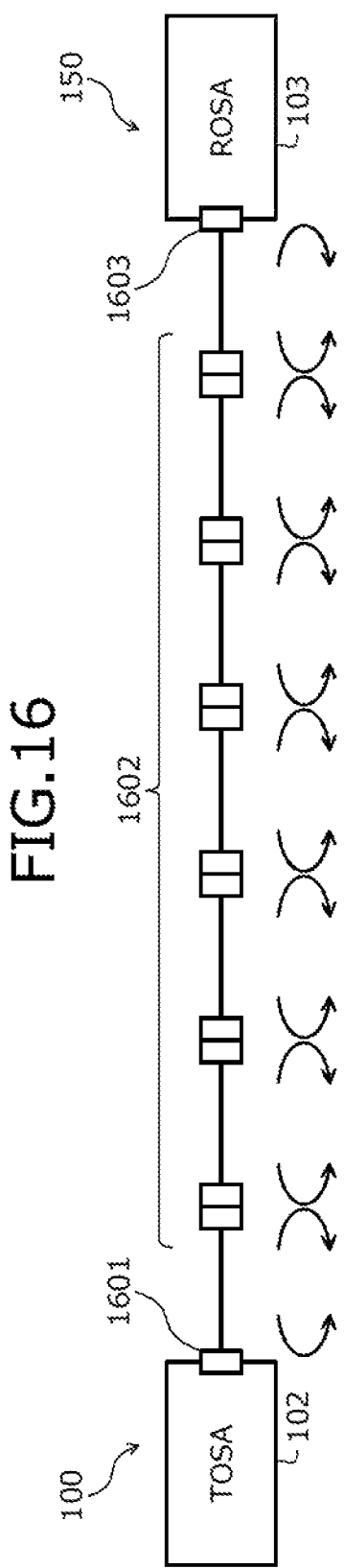
FIG. 16 is a diagram of an example of optical connector connection between transmitting apparatuses.

FIG. 16 is a diagram of an example of optical connector connection between the transmitting apparatuses. Plural optical connectors 1601 to 1603 are disposed in the optical transmission path 141 between the optical transmitting unit (TOSA) 102 of the transmitting apparatus 100 and the optical receiving unit (ROSA) 103 of the transmitting apparatus 150, and are optically coupled to each other. The optical connector reflection of each of the optical connectors 1601 to 1603 degrades the transmission characteristics.

Figure 17:
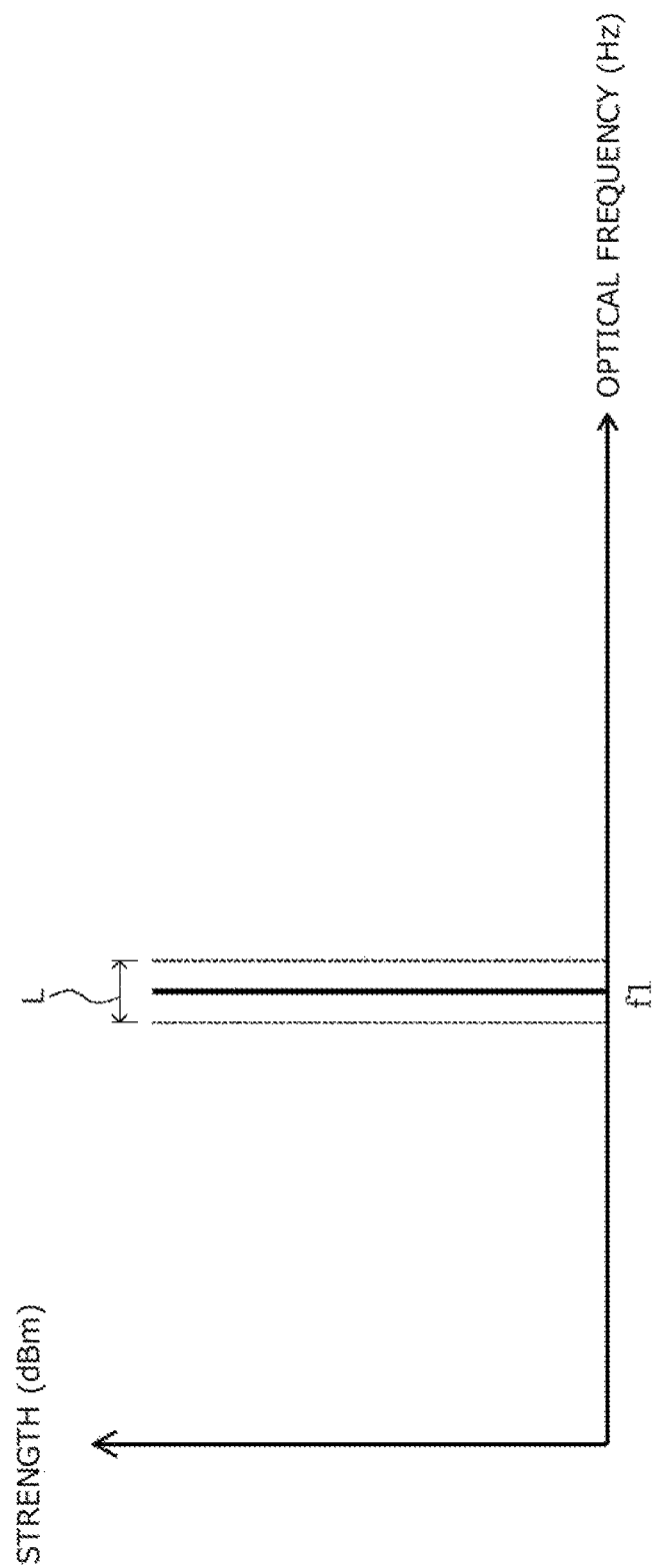
FIG. 17 is a diagram of an example of a fluctuation of oscillation frequency of a distributed feedback (DFB) laser.

The MPI will be described. The multipath interference (MPI) is an interference caused by multiple reflections generated by the plural optical connectors present in the span of the fiber between the transmitting apparatuses. FIG. 17 is a diagram of an example of the fluctuation of the oscillation frequency of a distributed feedback (DFB) laser (a laser including only a light beam having one wavelength). The horizontal represents optical frequency and the vertical axis represents strength. The oscillation frequency in DC driving (the control of driving in the state where the current applied to the laser is fixed at a predetermined value) of the DFB laser disposed in the optical transmitting unit (TOSA) 102 randomly fluctuates due to the spontaneous emission. The spectral line width L caused by the fluctuation (hereinafter, also referred to as "spectral line width" or "line width") is usually up to about 5 MHz centered on central optical frequency f1. In addition to this "fluctuation", superimposition of a pilot signal for control or for communication on the laser also causes the oscillation frequency to fluctuate. The fluctuation of the optical frequency in this case is at most, about several hundred MHz.

Figure 18:
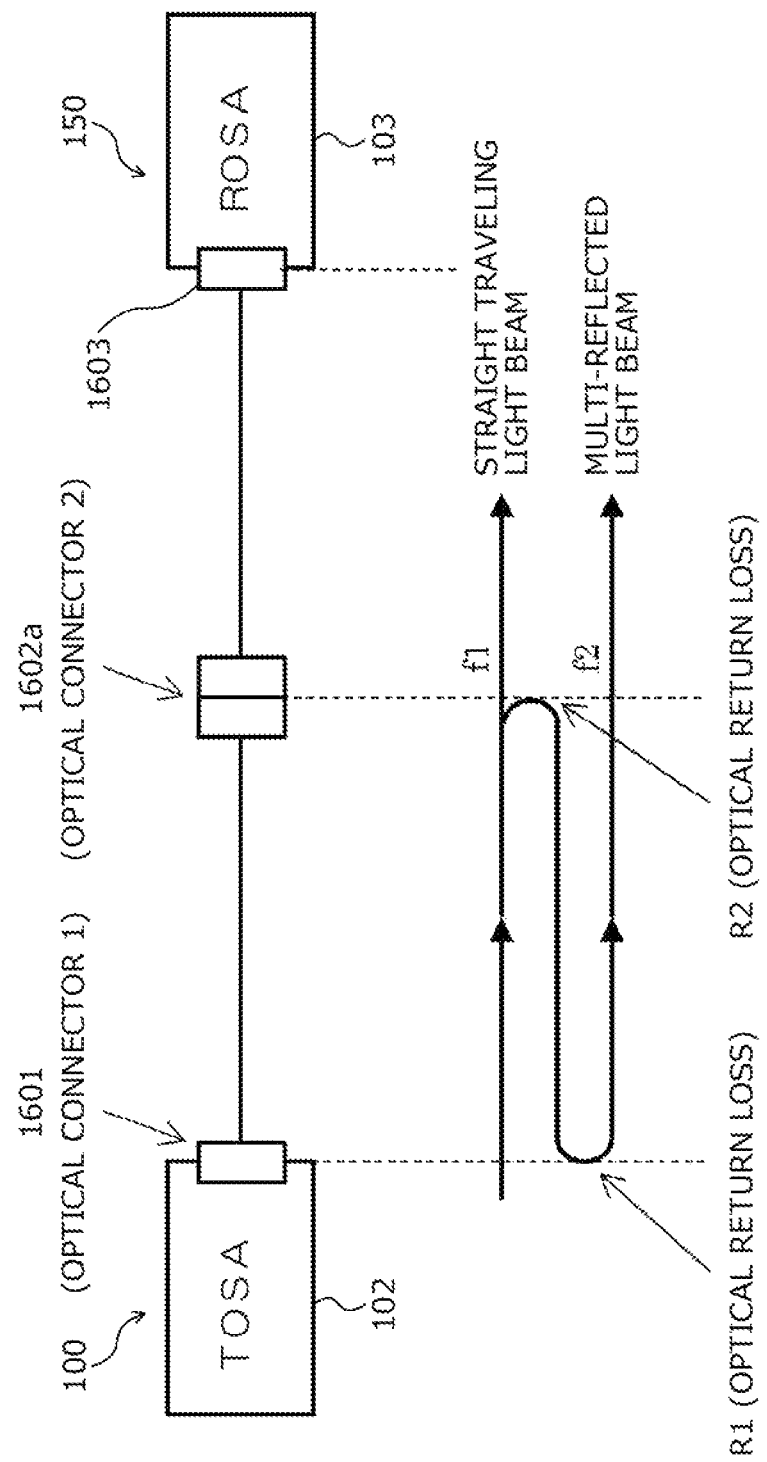
FIG. 18 is a diagram of an example of multiple optical reflections caused by optical connectors present between transmitting apparatuses.

FIG. 18 is a diagram of an example of the multiple optical reflections caused by the optical connectors present between the transmitting apparatuses. The reflection at an end of the optical connector 1 (1601) is denoted by "R1" and the reflection at an end of the optical connector 2 (1602a) is denoted by "R2". "f1" denotes the central optical frequency of a straight-traveling light beam not reflected at the position of an output of the optical connector 2 (1602a). "f2" denotes, for the same time, the central frequency of a light beam reflected multiple times. Because the multi-reflected light beam is the light beam output from the laser before the straight-traveling light beam is output therefrom, the optical frequency of the multi-reflected light beam differs according to the fluctuation of the oscillation frequency of the laser.

FIG. 19 is a diagram of an example of the interference caused by the multiple optical reflections. FIG. 19 depicts the optical spectra of the straight-traveling light beam and the multi-reflected light beam obtained at the output end of the optical connector 2 (1602a). At the end of the optical connector 2 (1602a), the straight-traveling light beam at the oscillation frequency f1 and the reflected light beam at the oscillation frequency f2 interfere with each other due to the fluctuation of the oscillation frequency of the laser (FIG. 17) and the multiple optical reflections (FIG. 18). The reflected light beam at the oscillation frequency f2 is a multi-reflected light beam and the reflection factor thereof is (R1+R2), and the strength of the reflected light beam is therefore reduced by the amount corresponding to the above. Because the MPI is generated due to the above factors, the frequency affected by the MPI usually is up to about 5 MHz corresponding to the amount of the fluctuation of the line spectrum and, when the pilot signal is superimposed, is about several hundred MHz at most. Among these, "the frequency range of several hundred MHz at most" with a large amount of fluctuation is a sufficiently low frequency relative to the band up to several ten GHz of the optical devices applied to the DMT scheme. This indicates that, under the DMT scheme, based on the effects of the MPI, a subcarrier at a low frequency (several hundred MHz) may be degraded by being affected by the multiple optical reflection.

Coping with the above, the present invention employs the following configurations 1 and 2 to avoid the frequencies of the spectral line width (L1) of the laser when the communication link is allocated without being affected by the MPI in the optical region.

A case 1 in which spectral line width of the laser is avoided will be described. The spectral line width of the laser usually is up to about 5 MHz. As a result, a storage unit for the line width information is disposed in the control unit 131 and information concerning the line width of the optical spectrum is stored in advance to the storage unit. The control unit 131 (the subcarrier selecting unit 135) allocates the communication link to the subcarriers except those at the line width frequencies corresponding to the information concerning the line width of the optical spectrum.

A case 2 in which frequency modulation different from a signal is superimposed on the laser will be described. As described above, in this case, the line width of the optical spectrum is about several hundred MHz depending on the frequency to be superimposed. The storage unit for the superimposed frequency information is therefore disposed in the control unit 131, and information concerning the line width of each of the superimposed frequencies is stored in advance to the storage unit. The control unit 131 (the subcarrier selecting unit 135) allocates the communication link to the subcarriers except those at the line width frequencies corresponding to the information concerning the frequencies to be superimposed.

When the communication link is allocated according to the configurations 1 and 2, the sending of the measurement signal is not limited to be from the low frequency side as in the third embodiment. The measurement signal may be sent from the high frequency side as in the fourth embodiment or the measurement signal may be sent at an arbitrary frequency as in the fifth embodiment.

Figure 20A:
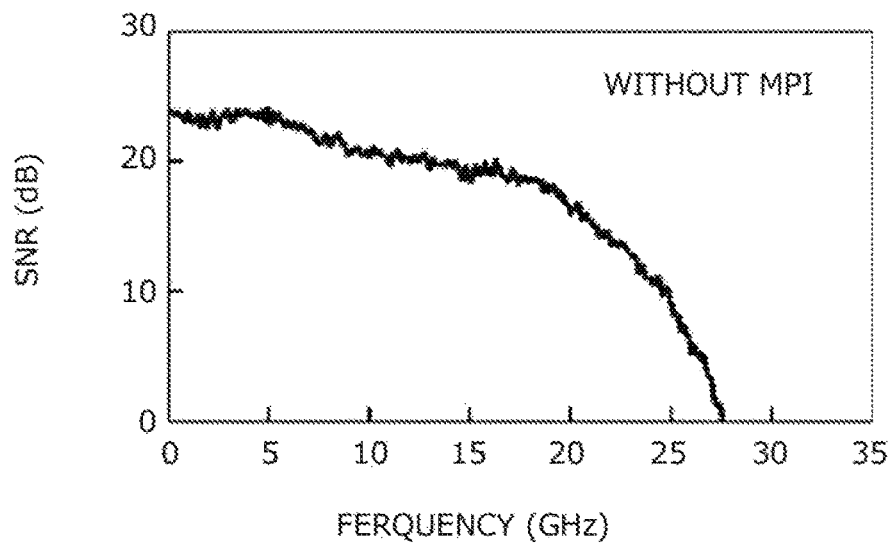
FIGS. 20A and 20B are graphs of an effect of MPI in an optical region caused by the optical connector connection.
Figure 20B:
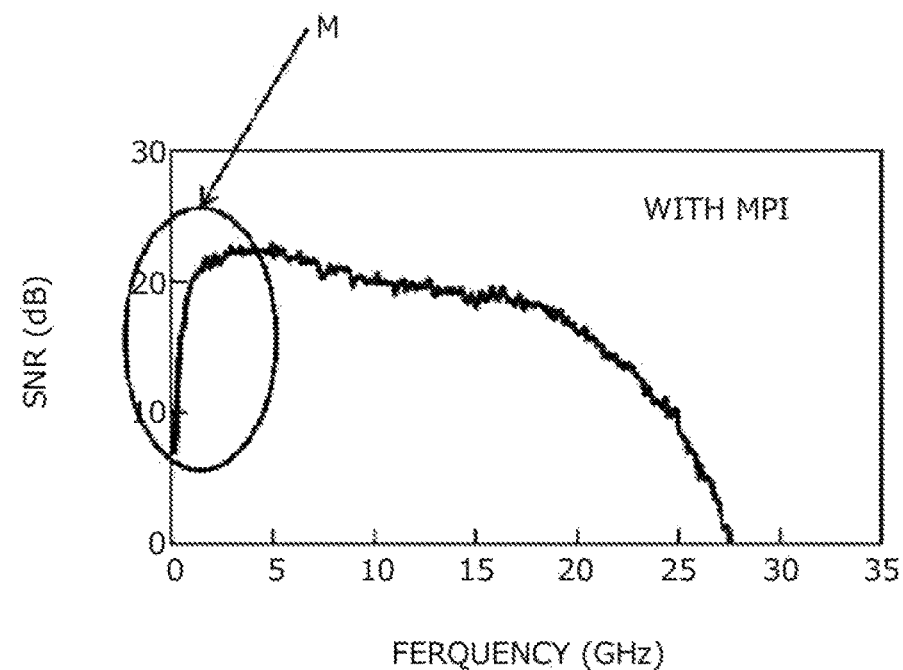

FIGS. 20A and 20B are graphs of the effect of the MPI in the optical region caused by the optical connector connection. The MPI in the optical region fluctuates due to the characteristics of each of the optical connectors 1601 to 1603 inserted between the transmitting apparatuses 100 and 150, and the number of the optical connectors 1601 to 1603 and is generated at a low probability while the MPI may be generated in a low frequency region when the conditions are inappropriate.

FIG. 20A depicts the transmission characteristics obtained when effect from the MPI in the optical region is received, and the horizontal axis represents the frequency and the vertical axis represents the SNR. In contrast, as depicted in FIG. 20B, significant degradation may occur in the subcarrier M at a low frequency close to a DC due to the generation of the MPI in the optical region (for example, refer to Toshiki Tanaka, et al, "400 GbE DMT Tolerance to MPI", September 2014, IEEE 802.3 Ottawa interim meeting; and Toshiki Tanaka, et al, "400 GbE DMT Tolerance to MPI Using DMT Test Chip", January 2015, IEEE 802.3 Atlanta interim meeting).

FIG. 21 is a graph of an example of the frequency characteristics obtained between the transmitting apparatuses. The horizontal axis represents the frequency and the vertical axis represents the SNR. As depicted in FIG. 21, a subcarrier N having an extremely poor SNR may be present among the subcarriers between the transmitting apparatuses.

This occurs due to the frequency characteristics of the optical transmitting unit (TOSA) 102 and the optical receiving unit (ROSA) 103 of the transmitting apparatus 100, and the transmission path (the transmission fiber) 141 between the transmitting apparatuses 100 and 150, and degradation of the electrical characteristics caused by the effects of electrical reflections by the transmitting apparatuses 100 and 150. The electrical reflections by the transmitting apparatuses 100 and 150 occur due to the optical reflections for inputting and outputting of the optical signal, mismatching of the electric impedance inside the apparatuses, the DAC 118 (ADC 122) with low performance, and the like. As depicted in FIG. 21, the subcarrier N having poor frequency characteristics may be generated at any one of the frequencies in the region of all the frequency bands (for example, refer to Masato Nishihara, et al, "Impact of modulator chirp in 100 Gbps class optical discrete multi-tone transmission system", February 2013, Photonics West 2013, SPIE).

As a result, in this state, any subcarrier capable of securing the communication link between the transmission side and the reception side cannot be allocated as a subcarrier for the communication link when the signal communication is started up. For example, when a subcarrier on the high frequency side is allocated to the communication link, the subcarrier having a poor SN may form the communication link. On the other hand, when a subcarrier on the low frequency side is fixedly allocated to the communication link, the communication link may be affected by the MPI in the optical region and transmission characteristics (such as the optical connector reflections).

As described, in this state, the communication link is highly likely to be allocated to a subcarrier having a poor transmission characteristics and no communication link can therefore be secured. Any communication may therefore not be able to be executed between the transmitting apparatuses 100 and 150.

In contrast, according to the embodiments, the transmission characteristics obtained between the transmitting apparatus and the opposing transmitting apparatus is measured using the measurement signal. The communication link is allocated to a subcarrier having excellent transmission characteristics. For example, a subcarrier having excellent transmission characteristics and least affecting the transmission capacity may be selected and allocated to the communication link by measuring the transmission characteristics of each of plural subcarriers.

The communication link may thereby be secured and the signal may be communicated between the transmitting apparatuses when the transmitting apparatus is started up. The transmission capacity of the subcarrier for the data communication may be increased as much as possible during the operation.

The transmitting apparatus transmits the measurement signal and, using the feedback of the measurement signal from the opposite transmitting apparatus, may easily and quickly measure the actual transmission characteristics of each of the transmitting apparatus and the opposite transmitting apparatus, and the actual transmission characteristics obtained between the transmitting apparatus and the opposite transmitting apparatus.

Not limiting to the time of the signal communication, during the operation, for example, the transmission characteristics obtained between the transmitting apparatuses may also be calculated and the communication link may be allocated to a subcarrier having excellent transmission characteristics among plural subcarriers, by sending the measurement signal on unused subcarriers. In this case, a stable communication link may be secured, increasing the transmission capacity of the subcarriers for the data communication.

The measurement signal is sent simultaneously using all the subcarriers included in the band used for the optical transmission. In addition, the measurement signal may also be sent sequentially using the subcarriers one by one from the low frequency side to the high frequency side. The measurement signal may also be sent sequentially using the subcarriers one by one from the low frequency side that is not affected by the MPI in the optical region, to the high frequency side. The measurement signal may also be sent sequentially using the subcarriers one by one from the high frequency side to the low frequency side.

Furthermore, the measurement signal may also be sent using arbitrary subcarriers included in the band used for the optical transmission. For example, in one transmission session of the measurement signal, the subcarrier numbers are intermittently selected and the measurement signal is simultaneously sent on the plural subcarriers and, in the next transmission session of the measurement signal, the subcarrier numbers different from the previously selected ones are intermittently selected and the measurement signal is simultaneously sent on the plural subcarriers. Not limiting to this, an arbitrary subcarrier may be used randomly in each transmission session of the measurement signal. As to these various types of transmission of the measurement signal, the transmitting apparatus may select the type of transmission that is suitable for variation at each timing, at each time point, and at each actual time point of the transmission band.

However, based on the current conventional DMT scheme, no subcarrier capable of securing a communication link between the transmitter and the receiver may be allocated to be used for the communication link when the signal communication is started up. It has been reported that the subcarrier of the frequency on the DC side is degraded based on the effects of fluctuation of multipath interference (MPI) in the optical region due to the optical connector connection between transmitting apparatuses (for example, refer to Toshiki Tanaka, et al, "400 GbE DMT Tolerance to MPI", September 2014, IEEE 802.3 Ottawa interim meeting; and Toshiki Tanaka, et al, "400 GbE DMT Tolerance to MPI using DMT Test Chip", January 2015, IEEE 802.3 Atlanta interim meeting).

It has also been reported that a subcarrier having poor frequency characteristics is indeterminately generated in any one region of all the frequency bands based on the frequency characteristics of the transmitting unit and the receiving unit of the transmitting apparatus, degradation of electrical characteristics due to the effect of electrical reflections inside the transmitting apparatus, and the like (for example, refer to Masato Nishihara, et al, "Impact of modulator chirp in 100 Gbps class optical discrete multi-tone transmission system", February 2013, Photonics West 2013, SPIE).

Therefore, for example, when a subcarrier on the low frequency side and having an excellent SN is set to be the communication link based on a fixed initial value, a subcarrier degraded by the effects of the MPI may be used. When a subcarrier at an arbitrary frequency is set to be the communication link, a subcarrier degraded by electrical influences inside the transmitting apparatus may also be used. As described, a conventional transmitting apparatus based on the DMT scheme cannot cope with variation of transmission characteristics of a transmitting apparatus or transmission path that differ according to the actual environment, and no subcarrier suitable for allocation of the communication link may be set. Therefore, no communication may be executed between the transmitting apparatuses when the transmitting apparatus is started up, or the like.

According to an embodiment, an effect is achieved in that a communication link may be allocated to a subcarrier having excellent transmission characteristics.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission system configured to optically transmit data from an optical transmitter to an optical receiver using a plurality of subcarriers, wherein
the optical transmitter includes a DMT-DSP configured to transmit a measurement signal using a subcarrier included in a band used for optical transmission when a signal is communicated to the optical receiver, the DMT-DSP being configured to calculate transmission characteristics obtained between the optical transmitter and the optical receiver based on the measurement signal returned from the optical receiver, and the DMT-DSP being configured to allocate, based on the transmission characteristics, a communication link to a subcarrier excellent in the transmission characteristics and least affecting transmission capacity, and
the optical receiver is configured to return the measurement signal received thereby to the optical transmitter, wherein
the DMT-DSP transmits the measurement signal using sequentially from a low-frequency-side subcarrier to a high-frequency-side subcarrier of the subcarriers included in the band used for the optical transmission, and allocates the communication link to a subcarrier having a predetermined strength, based on the transmission characteristics of each of the subcarriers used for transmitting the measurement signal.

2. The optical transmission system according to claim 1, wherein
the DMT-DSP transmits the measurement signal using all the subcarriers included in the band used for the optical transmission, and allocates the communication link to a predetermined subcarrier, based on the transmission characteristics of all the subcarriers.

3. An optical transmission system configured to optically transmit data from an optical transmitter to an optical receiver using a plurality of subcarriers, wherein
the optical transmitter includes a DMT-DSP configured to transmit a measurement signal using a subcarrier included in a band used for optical transmission when a signal is communicated to the optical receiver, the DMT-DSP being configured to calculate transmission characteristics obtained between the optical transmitter and the optical receiver based on the measurement signal returned from the optical receiver, and the DMT-DSP being configured to allocate, based on the transmission characteristics, a communication link to a subcarrier excellent in the transmission characteristics and least affecting transmission capacity, and
the optical receiver is configured to return the measurement signal received thereby to the optical transmitter, wherein
the DMT-DSP transmits the measurement signal using sequentially from a high-frequency-side subcarrier to a low-frequency-side subcarrier of the subcarriers included in the band used for the optical transmission, and allocates the communication link to a subcarrier having a predetermined strength, based on the transmission characteristics of each of the subcarriers used for transmitting the measurement signal.

4. An optical transmission system configured to optically transmit data from an optical transmitter to an optical receiver using a plurality of subcarriers, wherein
the optical transmitter includes a DMT-DSP configured to transmit a measurement signal using a subcarrier included in a band used for optical transmission when a signal is communicated to the optical receiver, the DMT-DSP being configured to calculate transmission characteristics obtained between the optical transmitter and the optical receiver based on the measurement signal returned from the optical receiver, and the DMT-DSP being configured to allocate, based on the transmission characteristics, a communication link to a subcarrier excellent in the transmission characteristics and least affecting transmission capacity, and
the optical receiver is configured to return the measurement signal received thereby to the optical transmitter, wherein the DMT-DSP transmits the measurement signal sequentially using a subcarrier at an arbitrary interval of subcarriers among the subcarriers included in the band used for the optical transmission, and allocates the communication link to a subcarrier having a predetermined strength, based on the transmission characteristics of each of the subcarriers used for transmitting the measurement signal.

5. The optical transmission system according to claim 3, wherein
the DMT-DSP transmits the measurement signal at frequencies excluding frequencies determined based on spectral line width characteristics of a laser of the optical transmitter.

6. The optical transmission system according to claim 4, wherein
the DMT-DSP transmits the measurement signal at frequencies excluding frequencies determined based on spectral line width characteristics of a laser of the optical transmitter.

7. The optical transmission system according to claim 3, wherein
the DMT-DSP transmits the measurement signal at frequencies excluding frequencies determined based on information concerning superimposed frequencies, when frequency modulation different from a signal is superimposed on a laser of the optical transmitter.

8. The optical transmission system according to claim 4, wherein
the DMT-DSP transmits the measurement signal at frequencies excluding frequencies determined based on information concerning superimposed frequencies, when frequency modulation different from a signal is superimposed on a laser of the optical transmitter.

9. The optical transmission system according to claim 1, wherein the DMT-DSP includes:
a generator unit configured to generate the measurement signal;
a subcarrier selecting unit configured to select the subcarrier used for sending the measurement signal;
a transmission characteristics calculating unit configured to calculate transmission characteristics obtained between the optical transmitter and the optical receiver based on the measurement signal returned from the optical receiver;
a property storage unit configured to store therein the calculated transmission characteristics; and
a communication link configuring unit configured to configure a subcarrier to be allocated to the communication link among the subcarriers included in the band used for the optical transmission, based on the transmission characteristics stored in the property storage unit.

10. The optical transmission system according to claim 9, wherein
the DMT-DSP further includes a bit allocation determining unit configured to determine a degree of multiple values of a modulated signal to be allocated to each subcarrier, corresponding to the selected subcarrier and the transmission characteristics.

11. An optical transmitter configured to optically transmit data to an optical receiver using a plurality of subcarriers, the optical transmitter comprising:
a DMT-DSP configured to transmit a measurement signal using a subcarrier included in a band used for optical transmission when a signal is communicated to the optical receiver, the DMT-DSP being configured to calculate transmission characteristics obtained between the optical transmitter and the optical receiver based on the measurement signal returned from the optical receiver, and the DMT-DSP being configured to allocate, based on the transmission characteristics, a communication link to a subcarrier excellent in the transmission characteristics and least affecting transmission capacity, wherein the DMT-DSP transmits the measurement signal using sequentially from a low-frequency-side subcarrier to a high-frequency-side subcarrier of the subcarriers included in the band used for the optical transmission, and allocates the communication link to a subcarrier having a predetermined strength, based on the transmission characteristics of each of the subcarriers used for transmitting the measurement signal.

12. An optical transmitter configured to optically transmit data to an optical receiver using a plurality of subcarriers, the optical transmitter comprising:
a DMT-DSP configured to transmit a measurement signal using a subcarrier included in a band used for optical transmission when a signal is communicated to the optical receiver, the DMT-DSP being configured to calculate transmission characteristics obtained between the optical transmitter and the optical receiver based on the measurement signal returned from the optical receiver, and the DMT-DSP being configured to allocate, based on the transmission characteristics, a communication link to a subcarrier excellent in the transmission characteristics and least affecting transmission capacity, wherein
the DMT-DSP transmits the measurement signal using sequentially from a high-frequency-side subcarrier to a low-frequency-side subcarrier of the subcarriers included in the band used for the optical transmission, and allocates the communication link to a subcarrier having a predetermined strength, based on the transmission characteristics of each of the subcarriers used for transmitting the measurement signal.

13. An optical transmitter configured to optically transmit data to an optical receiver using a plurality of subcarriers, the optical transmitter comprising:
a DMT-DSP configured to transmit a measurement signal using a subcarrier included in a band used for optical transmission when a signal is communicated to the optical receiver, the DMT-DSP being configured to calculate transmission characteristics obtained between the optical transmitter and the optical receiver based on the measurement signal returned from the optical receiver, and the DMT-DSP being configured to allocate, based on the transmission characteristics, a communication link to a subcarrier excellent in the transmission characteristics and least affecting transmission capacity, wherein
the DMT-DSP transmits the measurement signal sequentially using a subcarrier at an arbitrary interval of subcarriers among the subcarriers included in the band used for the optical transmission, and allocates the communication link to a subcarrier having a predetermined strength, based on the transmission characteristics of each of the subcarriers used for transmitting the measurement signal.

14. The optical transmission system according to claim 3, wherein the DMT-DSP includes:
a generator unit configured to generate the measurement signal;
a subcarrier selecting unit configured to select the subcarrier used for sending the measurement signal;

a transmission characteristics calculating unit configured to calculate transmission characteristics obtained between the optical transmitter and the optical receiver based on the measurement signal returned from the optical receiver;

a property storage unit configured to store therein the calculated transmission characteristics; and a communication link configuring unit configured to configure a subcarrier to be allocated to the communication link among the subcarriers included in the band used for the optical transmission, based on the transmission characteristics stored in the property storage unit.

15. The optical transmission system according to claim 14, wherein the DMT-DSP further includes a bit allocation determining unit configured to determine a degree of multiple values of a modulated signal to be allocated to each subcarrier, corresponding to the selected subcarrier and the transmission characteristics.

16. The optical transmission system according to claim 4, wherein the DMT-DSP includes:

a generator unit configured to generate the measurement signal;

a subcarrier selecting unit configured to select the subcarrier used for sending the measurement signal;

a transmission characteristics calculating unit configured to calculate transmission characteristics obtained between the optical transmitter and the optical receiver based on the measurement signal returned from the optical receiver;

a property storage unit configured to store therein the calculated transmission characteristics; and a communication link configuring unit configured to configure a subcarrier to be allocated to the communication link among the subcarriers included in the band used for the optical transmission, based on the transmission characteristics stored in the property storage unit.

17. The optical transmission system according to claim 16, wherein the DMT-DSP further includes a bit allocation determining unit configured to determine a degree of multiple values of a modulated signal to be allocated to each subcarrier, corresponding to the selected subcarrier and the transmission characteristics.

* * * * *